(12) United States Patent
Koning et al.

(10) Patent No.: US 7,103,745 B2
(45) Date of Patent: *Sep. 5, 2006

(54) TWO-LEVEL OPERATING SYSTEM ARCHITECTURE

(75) Inventors: Maarten Koning, Bloomfield (CA); Andrew Gaiarsa, Carp (CA); Thierry Preyssler, Oakland, CA (US)

(73) Assignee: Wind River Systems, Inc., Alameda, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 10/273,333

(22) Filed: Oct. 17, 2002

(65) Prior Publication Data

US 2004/0078543 A1     Apr. 22, 2004

(51) Int. Cl.
*G06F 9/50* (2006.01)
*G06F 12/02* (2006.01)

(52) U.S. Cl. .................. 711/173; 711/152; 718/104
(58) Field of Classification Search ............... 711/152, 711/163, 173; 718/102, 104, 106, 107; 713/200, 713/201
See application file for complete search history.

(56) References Cited

U.S. PATENT DOCUMENTS 6,567,897 B1 * 5/2003 Lee et al. .................. 711/153
6,684,343 B1 * 1/2004 Bouchier et al. .............. 714/4
6,751,679 B1 * 6/2004 Arndt et al. ................... 710/3

OTHER PUBLICATIONS

Teodosiu, "Hlve: Fault Containment for Shared-Memory Multiprocessors", SOSP'95, Aug. 1995.*

* cited by examiner

*Primary Examiner*—Gary Portka
(74) *Attorney, Agent, or Firm*—Davidson, Davidson & Kappel, LLC

(57) ABSTRACT

A computer system is provided comprising a core operating system and a system space having a number of memory locations. The core operating system creates a number of protection domains to partition the system space. Each of the partitions includes a partition operating system and a partition user application. Each partition operating system provides resource allocation services to the respective partition user application within the partition.

13 Claims, 17 Drawing Sheets

TWO-LEVEL OPERATING SYSTEM ARCHITECTURE

CROSS REFERENCE TO RELATED APPLICATIONS

This application is related to U.S. application Ser. No. 10/273,288, entitled HEALTH MONITORING SYSTEM FOR A PARTITIONED ARCHITECTURE and U.S. application Ser. No. 10/273,305, entitled INTERPARTITION COMMUNICATION, both filed on even date herewith, and the entire disclosures of which are hereby incorporated by reference in their entirety.

BACKGROUND INFORMATION

A computing environment comprising, for example, a CPU, memory and Input/Output (I/O) devices, typically includes an operating system to provide a way to control the allocation of the resources of the environment. Traditional multitasking operating systems (e.g., UNIX, Windows) have been implemented in computing environments to provide a way to allocate the resources of the computing environment among various user programs or applications that may be running simultaneously in the computing environment. The operating system itself comprises a number of functions (executable code) and data structures that may be used to implement the resource allocation services of the operating system.

Certain operating systems, called "real-time operating systems," have been developed to provide a more controlled environment for the execution of application programs. Real-time operating systems are designed to be "deterministic" in their behavior—i.e., responses to events can be expected to occur within a known time of the occurrence of the event, without fail. Determinism is particularly necessary in "mission-critical" and "safety-critical" applications, where the outcome of event responses is essential to proper system function. Real-time operating systems are therefore implemented to execute as efficiently as possible with a minimum of overhead. As a result, prior real-time operating systems have typically employed relatively simplistic protection models for system and user processes—typically all processes execute in the same space, thus allowing direct access to all system resources by all user tasks (system calls can be made directly). This real time operating system model provides the fastest execution speed, but is deficient in providing system protection.

In order to improve system protection, it has been proposed to provide an operating system that implements a "protection domain" architecture. VxWorks®AE, marketed by Wind River Systems of Alameda, Calif., is an example of such a protection domain system. Basically, the protection domain system segregates the computing environment into a number of "protection domains." Each protection domain is a "container" for system resources, executable code and data structures, as well as for executing tasks and system objects (such as semaphores and message queues). Each resource and object in the system is "owned" by exactly one protection domain. The protection domain itself is a self-contained entity, and may be isolated from other system resources and objects to prevent tasks executing in the protection domain from potentially interfering with resources and objects owned by other protection domains (and vice versa).

The protection domain system of VxWorks®AE also, however, provides mechanisms by which tasks executing in one protection domain may access resources and objects contained in a separate protection domain. Each protection domain includes a "protection view" that defines the system resources and objects to which it has access (i.e., the resources and objects which it can "see"). By default, each protection domain has a protection view that includes only the system resources and objects contained within that protection domain. However, a protection domain may acquire access to the resources of other protection domains by "attaching" to these protection domains. When a first protection domain has obtained "unprotected attachment" to a second protection domain, the second protection domain is added to the protection view of the first protection domain. Executable code in the first protection domain may use "unprotected links" to functions selected in the second protection domain, allowing tasks executing in the first protection domain to use the resources and access the objects of the second protection domain with a minimum of execution overhead.

Unrestricted access by all tasks executing in one protection domain to all the resources and objects of another protection domain may not be desirable, however, for reasons of system protection and security. The VxWorks®AE protection domain system therefore provides a further mechanism whereby individual tasks executing in a first protection domain may access resources or objects contained in a second protection domain, but without adding the second protection domain to the protection view of the first protection domain. This access is achieved by "protected attachment" of the first protection domain to the second protection domain via a "protected link" between executable code in the first protection domain and selected functions in the second protection domain. Using the protected link, a task running in the first protection domain may, for example, make a direct function call to a function existing in the second protection domain, without the need to alter the protection view of the first protection domain. Tasks in the first protection domain are prevented from accessing the second protection domain except through this protected link, thus preventing unauthorized accesses of functions and data in the second protection domain. Protected linking can be achieved without the need to use different code instructions for protected and unprotected accesses (increasing implementation flexibility), and without the need to create separate tasks in the protected protection domain to perform the desired actions.

Such a protection domain system allows the operating system to dynamically allocate system resources among processes and flexibly implements and enforces a protection scheme. This protection scheme can be formulated to control the impact of poorly written applications, erroneous or disruptive application behavior, or other malfunctioning code, on the operating system and other applications running in the computer system. The protection domain approach accomplishes the protection results in a manner that is transparent to application developers, and incurs minimal execution overhead.

While the known protection domain system achieves a significant advance in system protection, additional capabilities would be desirable. For example, in safety-critical applications, it would be desirable to separate user applications into discrete partitions so that the impact of any erroneous or disruptive behavior of a particular user application can be contained to the malfunctioning application itself.

SUMMARY

According to one exemplary embodiment of the present invention, a computer system is provided, comprising a core operating system and a system space having a number of memory locations. The core operating system partitions the system space into a plurality of partitions. Each of the partitions includes a partition operating system and a partition user application. Each partition operating system provides resource allocation services to the respective partition user application within the partition. Also according to another exemplary embodiment of the present invention, the core operating system is arranged to schedule the partitions such that the partition operating system, partition user application pairs are temporally partitioned from each other. According to another exemplary embodiment, the scheduling is a time multiplexed scheduling.

According to another exemplary embodiment of the present invention, a computer system is provided, comprising a core operating system and a system space having a number of memory locations. The core operating system creates a number of protection domains to partition the system space. Each of the partitions includes a partition operating system and a partition user application. Each partition operating system provides resource allocation services to the respective partition user application within the partition. Also according to another exemplary embodiment of the present invention, the core operating system is arranged to schedule the partitions such that the partition operating system, partition user application pairs are temporally partitioned from each other. According to another exemplary embodiment, the scheduling is a time multiplexed scheduling.

A first method according to an exemplary embodiment of the present invention is also provided. The method includes implementing a core operating system and providing a system space having a number of memory locations. Additional steps include operating the core operating system to partition the system space into a plurality of partitions; and implementing a partition operating system, partition user application pair in each partition whereby the partition operating system, partition user application pairs of the partitions are spatially partitioned from each other. The method provides the step of operating each partition operating system of each pair to provide resource allocation services to the respective partition user application within the partition.

A second method according to an exemplary embodiment of the present invention is also provided. The method includes implementing a core operating system and providing a system space having a number of memory locations. Additional steps include operating the core operating system to create a number of protection domains to partition the system space and implementing a partition operating system, partition user application pair in each partition whereby the partition operating system, partition user application pairs of the partitions are spatially partitioned from each other. The method provides the step of operating each partition operating system of each pair to provide resource allocation services to the respective partition user application within the partition.

Pursuant to a third method, an additional step is provided in the first and/or second methods, wherein the additional steps includes operating the core operating system to schedule the partitions such that the partition operating system, partition user application pairs are temporally partitioned from each other.

In with accordance with further embodiments of the present invention, computer readable media are provided, having stored thereon, computer executable process steps operable to control a computer to implement the embodiments described above.

DETAILED DESCRIPTION OF THE PREFERRED EMBODIMENTS

Figure 1:
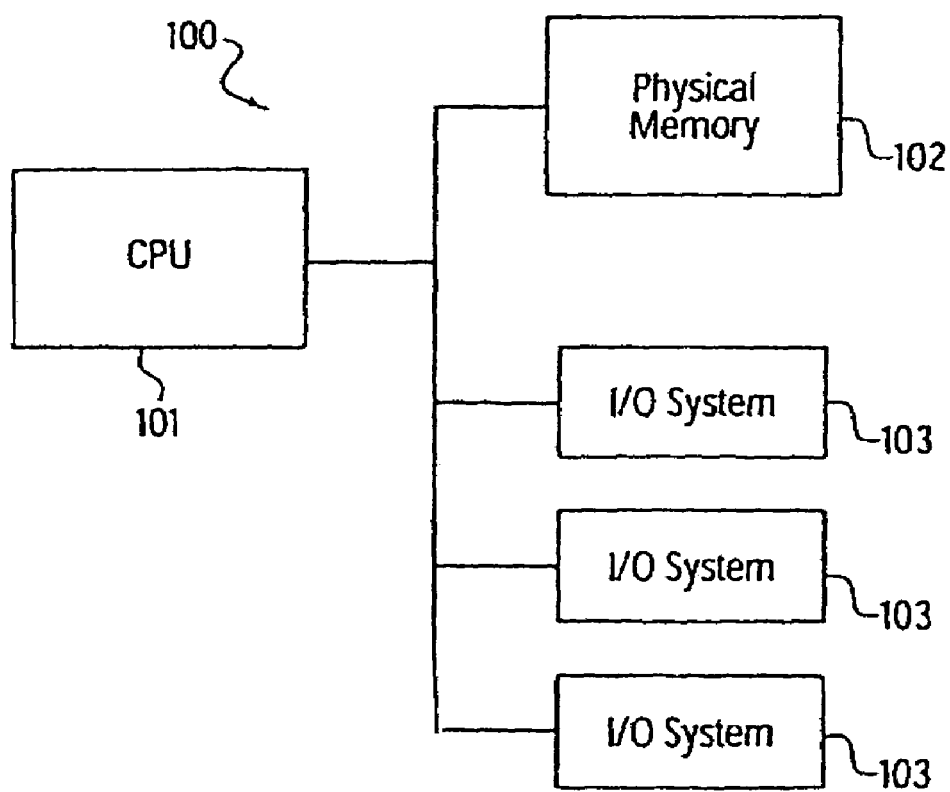
FIG. 1 shows a block diagram of an exemplary computer system implementing a two-level operating system architecture according to the present invention.

Referring now to the drawings, and initially to FIG. 1, there is illustrated in block diagram form, a computer system 100 comprising a CPU 101, which is coupled to a physical memory system 102 and a number of I/O systems 103. Connection of the CPU 101 to the physical memory system 102 and the number of I/O systems 103 may be according to any of the well known system architectures (e.g., PCI bus) and may include additional systems in order to achieve connectivity. I/O systems 103 may comprise any of the well known input or output systems used in electronic devices (e.g., key pad, display, pointing device, modem, network connection). Physical memory system 102 may include RAM or other memory storage systems, and read only memory and/or other non-volatile storage systems for storage of software (an operating system, other applications) to be executed in the computer system 100. Alternately, software may be stored externally of computer system 100 and accessed from one of the I/O systems 103 (e.g., via a network connection). CPU 101 may also include a memory management unit (MMU, not shown) for implementing virtual memory mapping, caching, privilege checking and other memory management functions, as is also well known.

Figure 2:
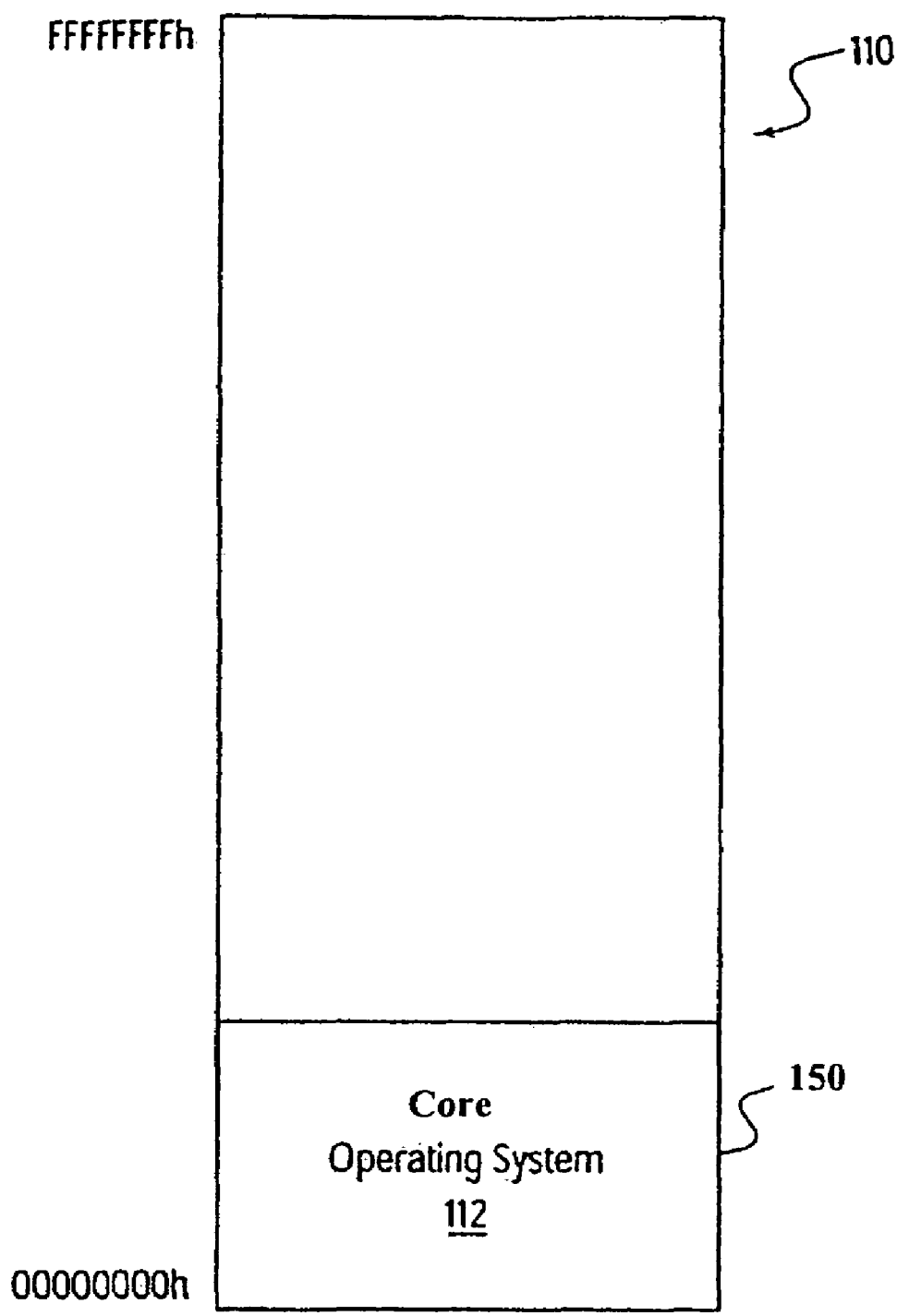
FIG. 2 shows an exemplary system space of the computer system of FIG. 1.

FIG. 2 illustrates an exemplary system space 110 of the computer system 100. System space 110 is, for example, an addressable virtual memory space available in the computer system 100. The system space 110 may be equal to or greater than the memory capacity of the physical memory 102 of the computer system 100, depending on system memory management implementations, as are well known. System space 110 may also include memory locations assigned as "memory mapped I/O" locations, allowing I/O operations through the system space 110. As shown in FIG. 2, the system space 110 includes addressable locations from 00000000h (hexadecimal) to FFFFFFFFh, defining a 32-bit addressable space. In this example, the system space 110 is implemented as a "flat" address space: each address corresponds to a unique virtual memory location for all objects in the system space 110 regardless of the object's owner. Other known addressing methods may also be used.

According to the present invention, the system space 110 stores a core operating system 112, such as, for example the VxWorksAE® operating system. The core operating system 112 includes executable code and data structures, as well as a number of executing tasks and system objects that perform system control functions, as will be described in more detail below. Pursuant to the present invention, the core operating system 112 implements a protection domain system in which all resources and objects are contained within protection domains. The core operating system itself can be contained in a protection domain 150. The exemplary protection domain system of the core operating system 112 is also object oriented, and each protection domain is a system object.

By way of background, operating systems implemented in an "object oriented" manner are designed such that when a particular function and/or data structure (defined by a "class" definition) is requested, the operating system creates ("instantiates") an "object" that uses executable code and/or data structure definitions specified in the class definition. Such objects thus may contain executable code, data structures, or both. Objects that perform actions are typically referred to as "tasks", "threads," or "processes" (which may include tasks or threads)—they may all be referred to generally as executable entities, but will be referred to herein simply as tasks for purposes of clarity. Upon loading and execution of an operating system into the computing environment, system tasks will be created in order to support the resource allocation needs of the system. User applications likewise upon execution may cause the creation of tasks ("user tasks"), and other objects in order to perform the actions desired from the application.

The structure of each protection domain is defined through a protection domain "class" definition. A protection domain may be created, for example, by instantiating a protection domain object based on the protection domain class. Only the core operating system 112 can create or modify (or destroy) a protection domain, although user tasks can request such actions through a protection domain application programming interface (API) provided by the core operating system. A protection domain object is owned by the protection domain that requested its creation.

Figure 3:
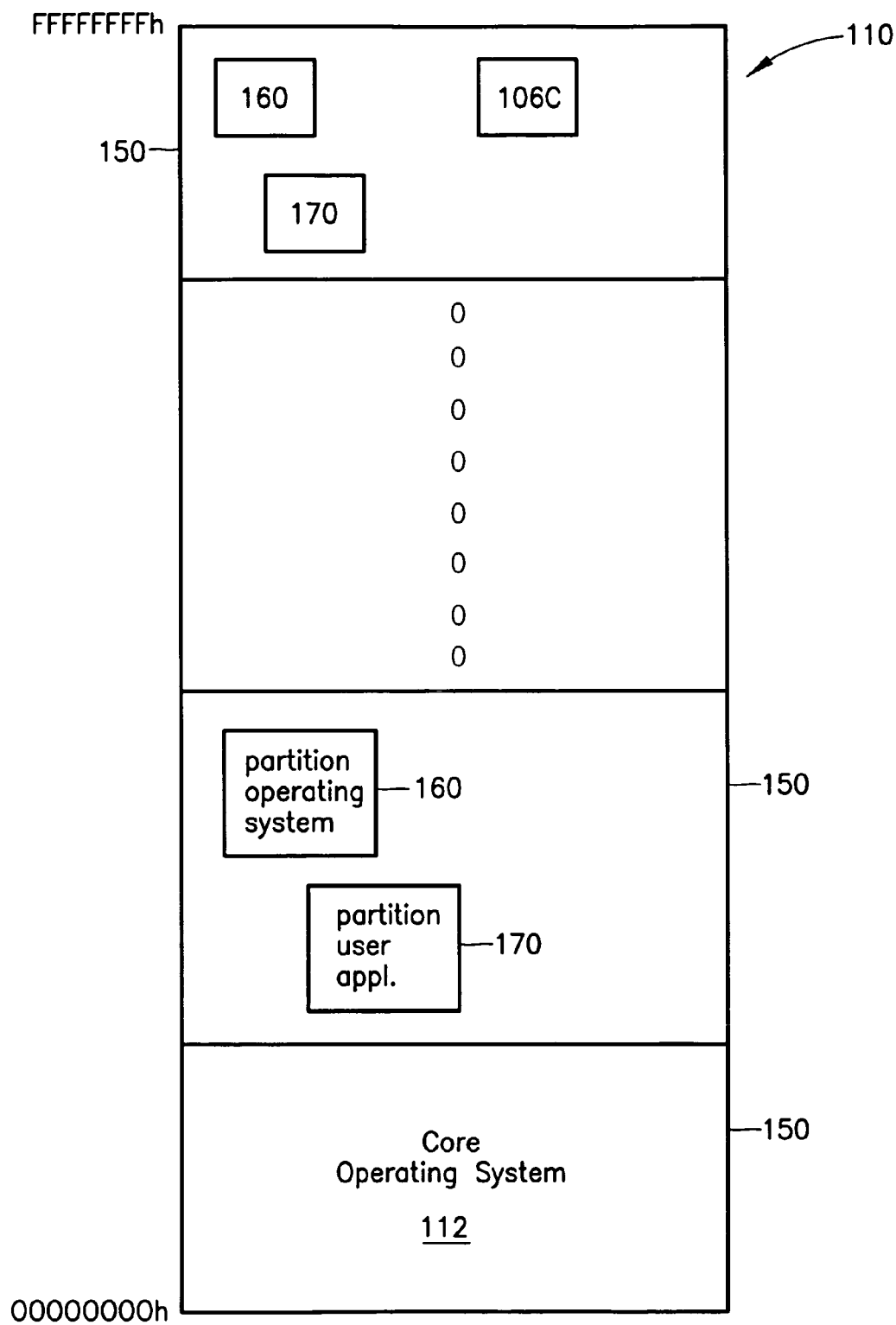
FIG. 3 shows the system space of FIG. 2 arranged into partitions according to an exemplary embodiment of the two-level operating system architecture according to the present invention.

Referring now to FIG. 3, there is illustrated the system space 110 of FIG. 2 arranged into partitions according to an exemplary embodiment of the two-level operating system architecture according to the present invention. The core operating system 112 instantiates a number of protection domains 150 to provide partitions within the memory system space 110, as will be described in more detail below. Instantiated within each partition defined by a protection domain 150 is a partition operating system 160 and a partition user application 170. According to this exemplary embodiment of the present invention, each partition operating system 160 is dedicated to the respective partition user application 170 within the same protection domain 150, and the partition user application 170 interacts with the respective partition operating system 160. The partition operating system 160 allocates resources instantiated within the protection domain 150 to the respective partition user application 170 (or requests resources outside the protection domain 150 via the OS abstraction layer to core operating system 112, as described further below). As discussed, each of the partition operating system 160 and the respective partition user application 170 of a particular protection domain-defined partition comprises objects including executable code and/or data structures. All of such objects are instantiated in the respective protection domain of the partition. The term "user application" is used herein to denote one or more user applications instantiated within a particular protection domain.

In this manner, user applications can be spatially separated into discrete partitions of the system space 110 so that they are unable to interact with each other, except through explicit mechanisms, as for example, under tight control of the two-level operating system architecture implementing the protection domain scheme. Moreover, each user application 170 can be controlled through explicit allocation of resources owned by the protection domain, by the partition operating system 160, to prevent the applications from affecting the operation of the entire system.

Pursuant to the exemplary embodiment of the present invention, the core operating system 112 performs certain functions for the overall system and/or on behalf of each partition operating system 160. As discussed, the core operating system 112 creates and enforces partition boundaries by instantiation of the protection domains 150. The core operating system 112 schedules partition processor usage among the several protection-domain-defined partitions, to determine which user application and respective partition operating system will be operating at any given time. In addition, the core operating system 112 can control system resource allocation, the passing of messages between the partitions, the handling of interrupts, the trapping of exceptions and the execution of system calls, on behalf of the partition operating systems 160, and the Input/Output systems 103.

Each of the partition operating systems 160 can be implemented from object components of a real time operating system such as, for example, VxWorks®, marketed by Wind River Systems of Alameda, Calif. The components can include, for example, kernel, math, stdio, libc and I/O functionality of the VxWorks® real time operating system to achieve resource allocation for user task management and inter-task communication for the respective partition user application 170. Each partition operating system 160 is also implemented to support user-application level context switches within a partition, and to indirectly interact with I/O devices via calls to the core operating system 112. Each partition operating system 160 can also be configured to call the core operating system 112 for access to resources maintained at the system level, and for the handling of traps and exceptions by the core operating system 112. Accordingly, the partition operating system 160 appears to be the only operating system to user application 170, and thus user application 170 can be implemented in a standard manner, without consideration of the interface or operation of core operating system 112.

Figure 4:
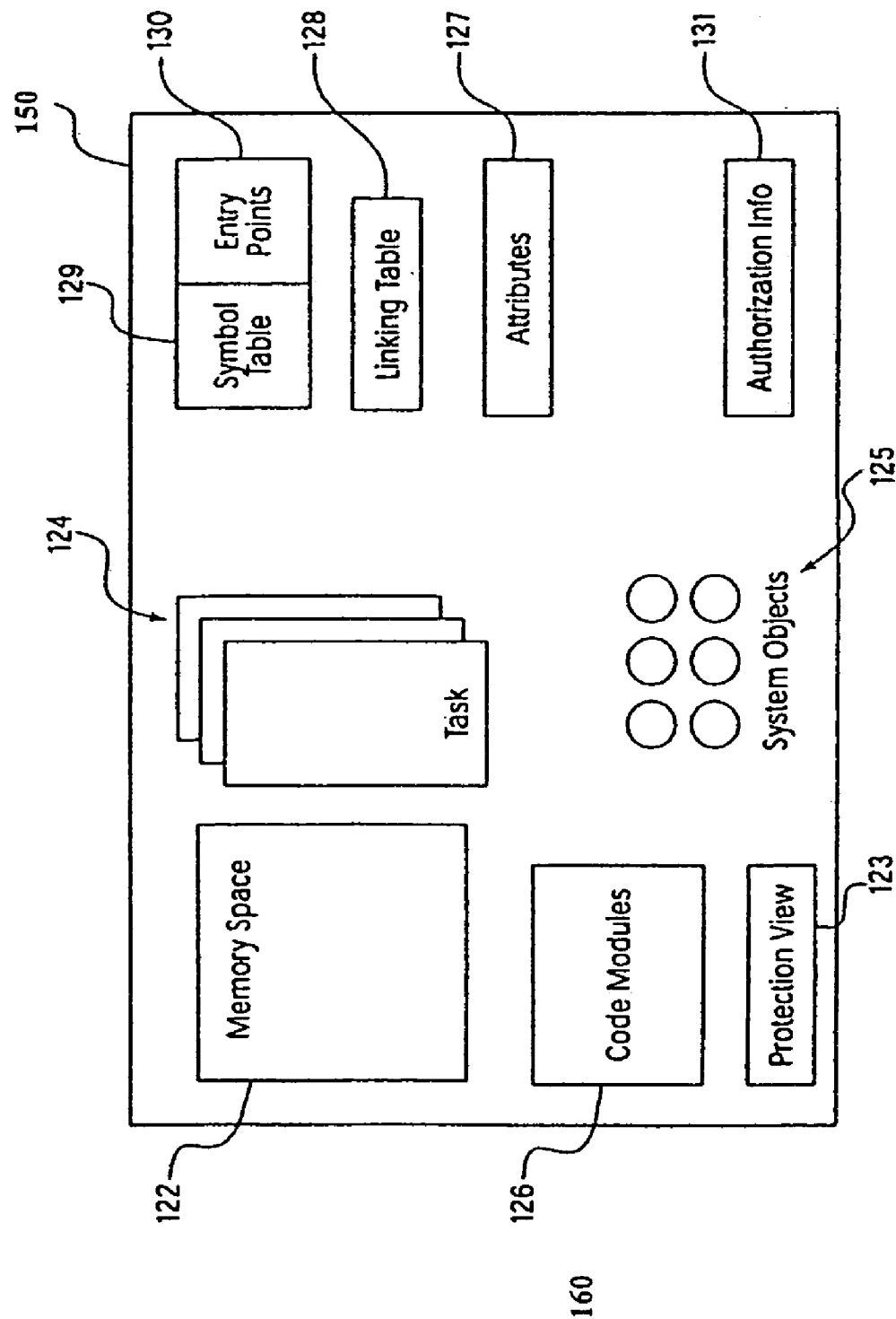
FIG. 4 shows a logical block diagram of an exemplary protection domain implemented in the system space of FIG. 3.

Referring now to FIG. 4, there is illustrated a logical block diagram of an exemplary protection domain 150, as may be created by the core operating system 112. The specific components capable of being "owned" by a protection domain 150 may be specified in the protection domain class definition. Exemplary protection domain 150 may be considered the owner of one or more of the following components:

a memory space 122,
a protection view 123,
zero or more code modules 126 containing executable code and/or data structures of, for example, the partition operating system and partition user application,
a collection of protection domain "attributes" 127,
a linking table 128 and a symbol table 129 including a list of entry points 130,
zero or more tasks 124, and
zero or more system objects 125 (e.g., semaphores, file descriptors, message queues, watchdogs).

Memory space 122 comprises a number of virtual memory locations from system space 110. These memory locations need not be contiguous, and may include memory mapped I/O locations. The amount of memory allocated to the memory space 122 of a protection domain 150 by the core operating system 112 may be specified at the time protection domain 150 is created. Additional memory may be dynamically allocated to memory space 122 by the core operating system 112 as needed from any free memory in system space 110. The code modules are stored within the memory space 122.

Figure 5:
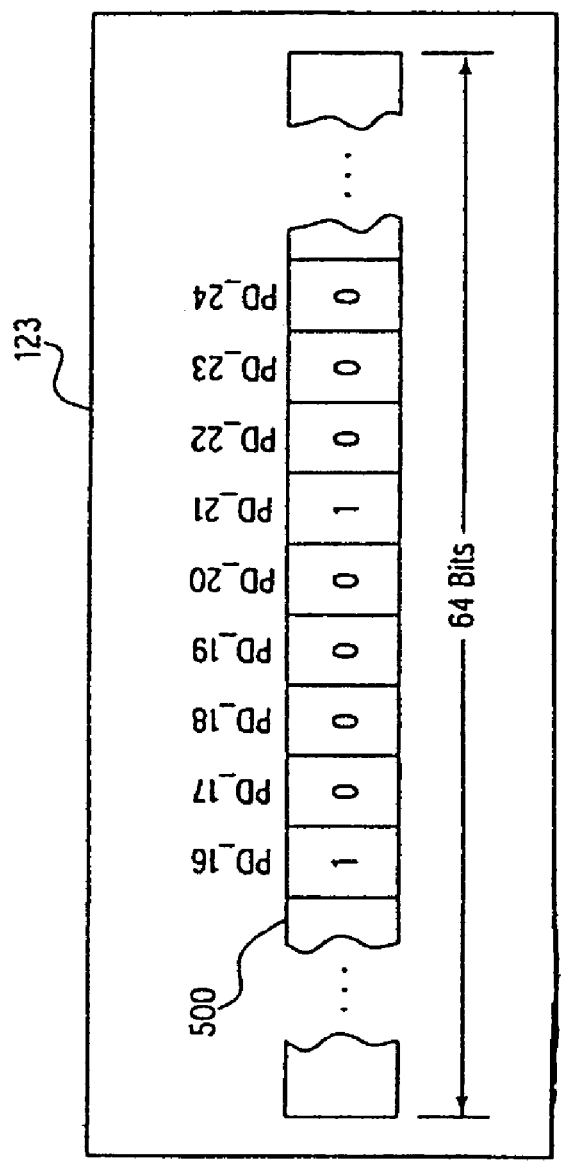
FIG. 5 shows an exemplary protection view data structure from the protection domain of FIG. 4.

Upon creation of the protection domain 150, the protection view 123 is established. The protection view 123 represents all of the protection domains 150 to which tasks executing in the protection domain 150 illustrated in FIG. 4 may have access. An exemplary protection view data structure 500 that may be used to represent the protection view 123 is illustrated in FIG. 5.

Protection view data structure 500 is a bit map for a particular protection domain 150, in which each protection domain 150 in the system space 110 is represented by a single bit. Where a bit is set, the respective protection domain 150 represented by the bit map has unprotected access to the memory space 122 of the corresponding protection domain in system space 110. Where a bit is not set, unprotected access is not permitted. The core operating system 112 may maintain information for mapping each bit to an existing protection domain 150. The size of the bit map defines the maximum number of protection domains supported in the system space 110; in this example, sixty-four protection domains are possible. Note that other data structures or different sized bit maps could be used to represent the protection view 123 to increase or decrease the number of protection domains that can be in a protection view. The default condition for a specific protection domain 150 is a protection view 123 that includes only the resources and objects of the memory space 122 of that protection domain 150, and no other protection domains. In the exemplary bit map of protection view data structure 500, this default condition may be represented by setting the bit corresponding to the illustrated protection domain, while leaving the remaining bits cleared (value zero). A protection domain 150 may expand its protection view 123 by being "attached" to other protection domains during the linking process when code modules or other objects are loaded into protection domain 150, pursuant to features of the VxWorks®AE operating system.

Also upon creation of a protection domain 150 by the core operating system 112, a set of protection domain attributes 127 may be specified. These attributes may be used to control the actions allowed by tasks executing in the created protection domain 150, the linking permitted between the created protection domain 150 and other protection domains in the system space 110, and other characteristics of the protection domain 150. Among the protection domain attributes 127 supported by protection domains 150 of, for example, the VxWorks®AE operating system are:

the name of the protection domain
the maximum memory size of the protection domain
whether the protection domain may be linked to by code modules in other protection domains ("linkage control")
the processor privilege mode that may be assigned to tasks created ("spawned") in the protection domain (e.g., user/supervisor), Other attributes may also be used, depending on the specific implementation of the protection domain system.

In addition, during the protection domain creation process by the core operating system 112, the memory space 122 is loaded with code modules 126. Pursuant to the present invention, the code modules 126 include the partition operating system 160 of the respective partition 150, and the respective user application 170. The code modules 126 comprising the partition operating system 160 and the respective partition user application 170, are therefore spatially separated from other code modules of system space 110 by a protection domain-defined partition. Thus, according to the present invention, execution of user tasks, and resource allocation control functions of the partition operating system for the specific tasks can be accomplished from within a protected and separated portion of the system space 110. Such an arrangement minimizes the ability of a user application from affecting anything within the system space that is beyond its partition.

For maximum security, the protection view of a partition 150 can be set in the default mode wherein only objects within the specific protection domain memory space 122 can be accessed by executable code executing within the partition 150. Thus, each partition operating system and partition user application pair can be substantially spatially isolated from all other system space.

However, the executable code may include a number of instructions, which, for example, in the case of a code module of the respective partition user application 170, reference other executable code or data structures outside of code module 126 (e.g., via a "jump" or "branch" instruction to execute a function). These references may be made using "symbols" that are intended to represent the memory location of the desired code or data structure. In order to determine ("resolve") the memory address value of these symbols, the loading of code modules 126 may include a linking process of the type provided in the VxWorks®AE operating system, that attempts to resolve symbol references by searching for other occurrences of the symbol either in other code modules 126 already loaded into the respective protection domain 150, or in code modules loaded into other protection domains.

As illustrated in FIG. 4, a symbol table 129, with entry points 130, and a linking table 128, are provided. These tables are features of the VxWorks®AE operating system that can be used to achieve protected links between executable code in one protection domain 150 and resources of another protection domain, if desired.

Figure 9:
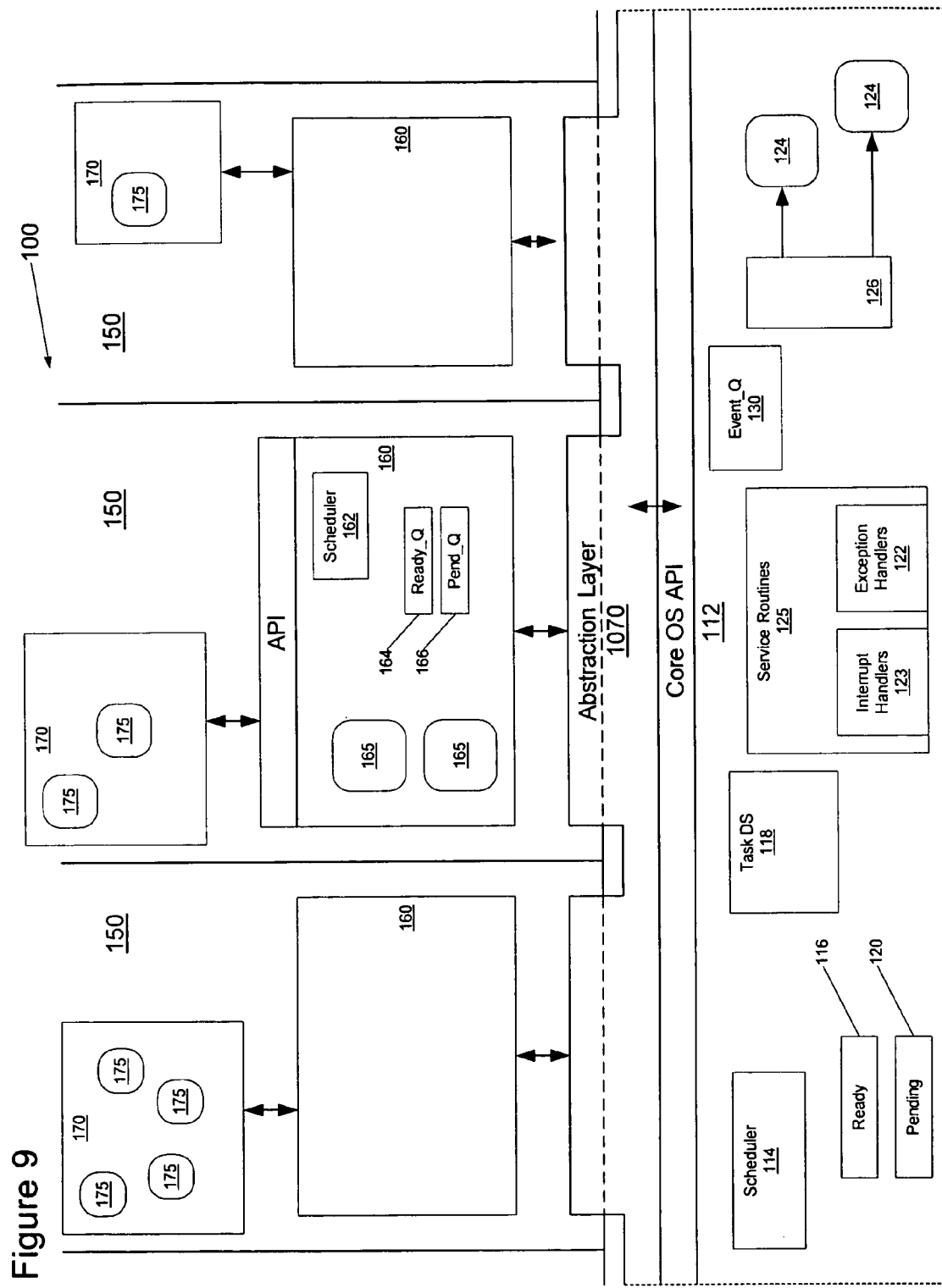
FIG. 9 illustrates an exemplary layout of system space in additional detail.

FIG. 9 illustrates an exemplary layout of system space 110 in additional detail. As shown in this example, three partitions 150 are established in system 100, each containing a partition OS 160 and a user application 170. Each user application 170 includes one or more user tasks 175 which may execute within their respective partition 150. Each partition OS 160 provides a partition OS API to allow user applications 170 to access the services provided by partition OS 160. Each partition OS 160 may also include a number of system tasks 165 instantiated to perform system services requested by user application 170. Partition OS 160 includes a scheduler 162 to control the scheduling of tasks executable within the partition 150 (i.e., user tasks 175 and system tasks 165), and a ready queue 164 and a number of pending queues 166 to implement task ordering and blocking.

Abstraction layer 1070 provides a facility for partition OS's 160 to communicate with Core OS 112 (as will be further described below). Core OS 112 provides its own API, which is only accessible via abstraction layer 1070.

Among the facilities provided by core OS 112 are a task data structure 118, a scheduler 114, a number of ready queues 116 and pending queues 120, and various service routines 125 (such as interrupt handling routines 123 and exception handling routines 122). Task data structure 118 includes entries for each core OS task which exists in system 100. Each partition 150 also has an entry in the task data structure 118. A core OS task is created which executes the partition OSes. Within this core OS task, the partition OS provides a multithreading capability to support the various user tasks. This core OS task has an entry in the task data structure 118, as partitions are schedulable entities, and the task data structure 118 provides a convenient location for storing parameters associated with the partition 150.

Core OS 112 also includes certain pre-instantiated tasks 124—referred to as "worker tasks." Each partition 150 is preferably associated with at least one worker task 124. Worker tasks are tracked by a worker task data structure 126 (preferably maintained for each partition as a linked list). As described further below, worker tasks 124 may be used by partitions to perform core OS services that are blocking, thus allowing other ready tasks in the partition to execute.

Core OS 112 also includes a number of "event queues" 130. Each partition has a corresponding event queue 130 located in core OS 112. As further described below, data related to events (e.g., system call complete, clock ticks) pertaining to a partition are stored in the event queue for delivery to the partition via the "pseudo-interrupt" facility.

Pursuant to a feature of the exemplary embodiment of the present invention, the core operating system 112 schedules partition operation to determine which partition operating system, partition user application pair is to execute at any particular time. The core operating system implements temporal partitions, preferably using a time-multiplexed schedule, between the partition operating system, partition user application pairs of the protection domain-defined spatial partitions 150.

Figure 6:
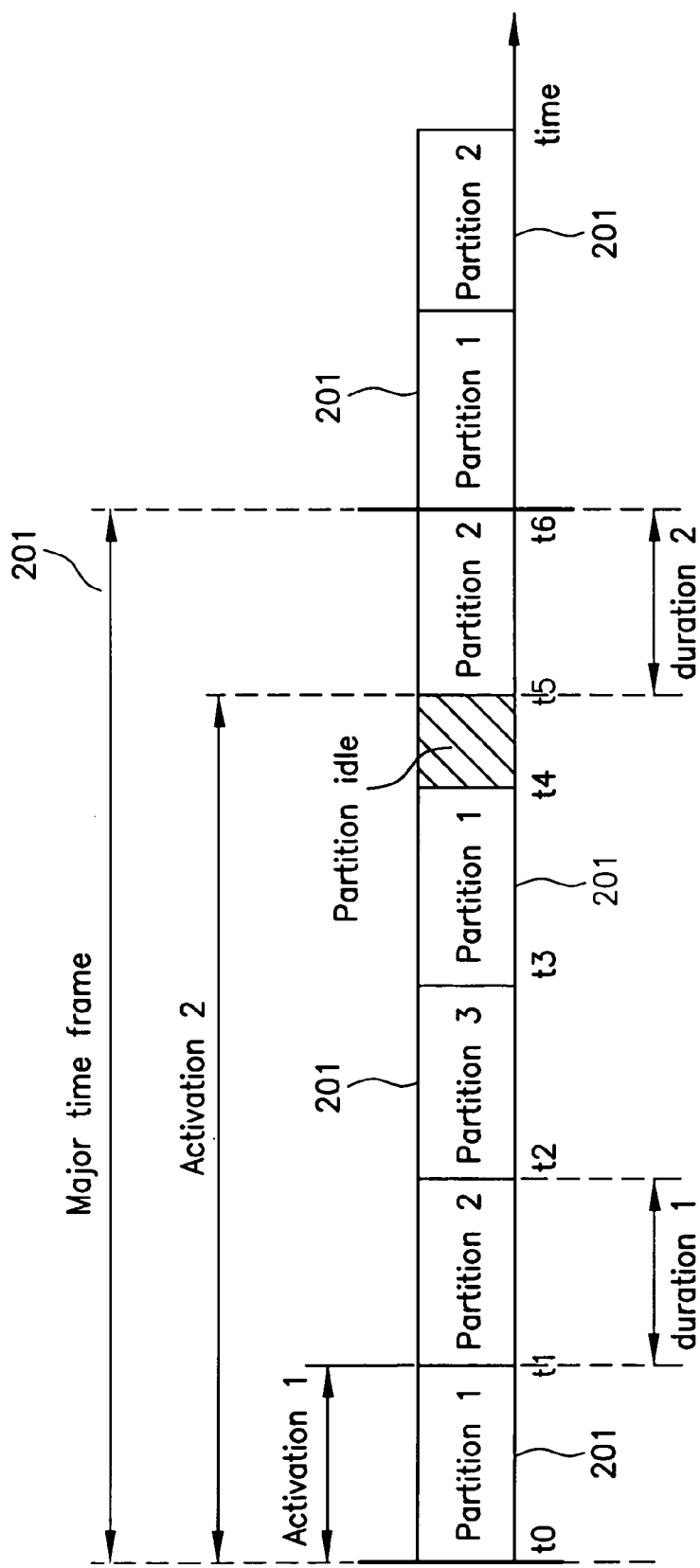
FIG. 6 shows a graphical representation of a time-multiplexed partition scheduling arrangement according to the present invention.

A preferred time-multiplexed schedule is illustrated in FIG. 6. A timing sequence comprises a series of major time frames 200. The major time frames 200 are repetitive, and each major time frame 200 has a predetermined, fixed periodicity. In this manner, the major time frames 200 are deterministic. The basic scheduling unit of the major time frame 200 is a temporal partition 201, and there is no priority among the temporal partitions 201.

Alternative schemes for providing temporal partitions could also be used. For example, a priority based scheme could be used wherein the partition with the highest priority task (or other operation) is scheduled for a specified duration.

Returning to the time-multiplexed schedule of FIG. 6, at least one temporal partition 201 is allocated to each protection domain-defined spatial partition 150, and a protection domain-defined partition 150 is activated by allocation of at least one temporal partition 201 from within the major time frame 200 to the particular partition 150. Each temporal partition 201 has two attributes, an activation time within the major time frame 200 (in FIG. 6, indicated by t0–t6) and an expected duration (in FIG. 6, indicated by "duration1", "duration 2"). Each temporal partition is defined by an offset from the start of a major time frame 200 (the activation time) and its expected duration. The duration of each temporal partition is set in fixed increments. The value of the increments can be configurable.

Figure 10:
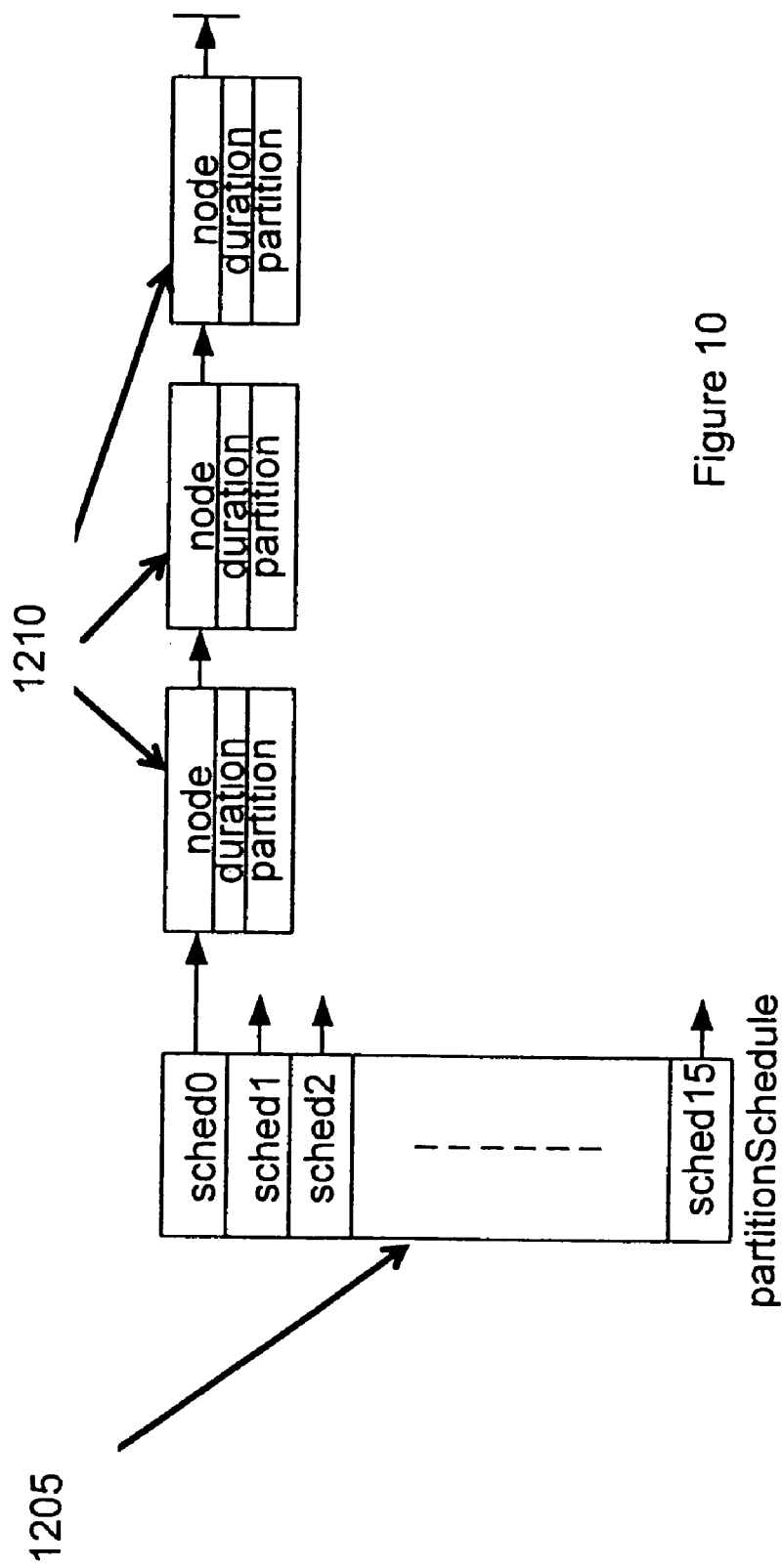
FIG. 10 shows an exemplary data structure to maintain partition scheduling data.

FIG. 10 shows an exemplary scheduling data structure 1205 to maintain partition scheduling data (which may be maintained in core OS 112). Scheduling data structure 1205 is implemented as a table of linked lists 1210, with each linked list 1210 corresponding to a particular schedule "mode" (further described below). Each element 1215 of the linked lists 1210 define a temporal partition 201 (i.e., an activation time and a duration) and indicate the spatial partition 150 which corresponds to the temporal partition (i.e., the spatial partition 150 that should become active during the temporal partition 201). Note that the activation time need not be included in the scheduling data structure 1205, as it can be derived from the sum of all preceding durations. Idle periods during the major time frame 200 may be denoted in the scheduling data structure 1205 as a list element having a corresponding spatial partition of a pre-defined code (such as 0x0000 or 0xFFFF). The size of scheduling data structure 1205 is shown as sixteen entries, however this size may be reduced or increased as desired in other implementations.

Figure 11:
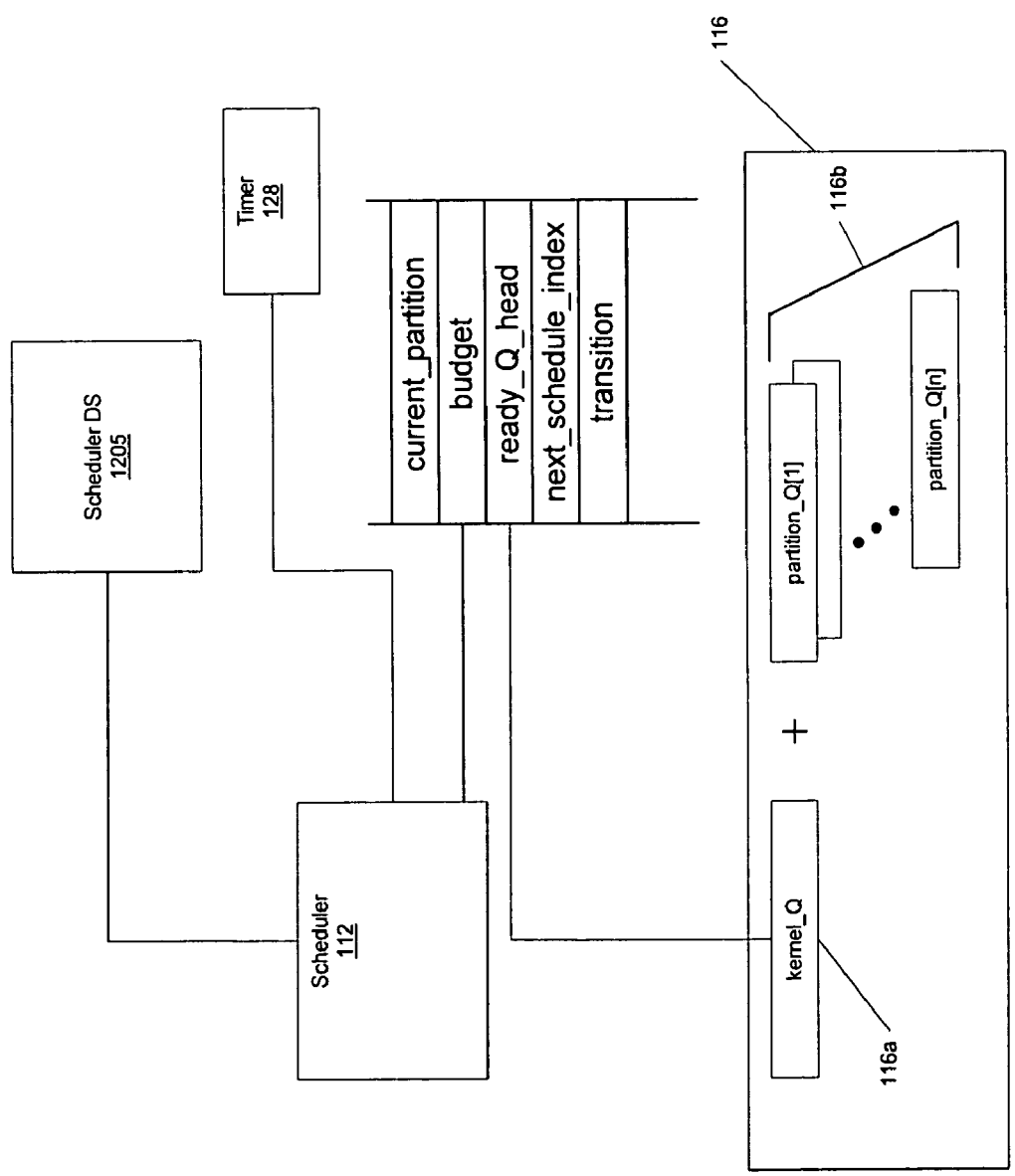
FIG. 11 illustrates an exemplary system implementing the scheduling of temporal partitions by the core OS.

FIG. 11 illustrates an exemplary system implementing the scheduling of temporal partitions 201 by core OS 112. Ready queue 116 is implemented as multiple queues: a kernel ready queue 116a (containing core OS tasks) and a partition ready queue 116b for each spatial partition 150 in the system 100 (containing the partition 150, and any other tasks associated with the partition 150, such as worker tasks 124). Partition ready queue 116b may be implemented as an array, such that it may be indexed for each partition. The "ready queue" that is visible to scheduler 112 will only be the combination of the kernel ready queue and the active partition ready queue. A data structure "ready_q_head" is used as a pointer to the first task/partition available to execute from the combined ready queue in a particular temporal partition 201.

A data structure "budget" is maintained to track the amount of time remaining in the current temporal partition 201. Core OS 112 includes a timer facility 128, which causes "ticks" to be generated at regular intervals (which may be specified by implementation). Receipt of a tick by the scheduler 114 causes a decrement of the budget. Upon reaching zero, the temporal partition expires and a new partition must be scheduled.

According to the preferred embodiment, different scheduling "modes" may be specified, for example, through the use of multiple linked lists in the schedule data structure 1205. A data structure "next_schedule_index" is maintained containing an index to the mode that should be used next from the schedule data structure 1205. A data structure "transition" is also maintained, containing an indicator of when the transition to the next schedule mode should occur. According to the preferred embodiment, this transition indicator can indicate a transition on the next tick, the end of the next temporal partition 201, or the end of the next major frame 200. Under normal operating conditions, the next schedule mode will be the current schedule mode, and the transition code indicator will cause a transition at the end of the next major frame 200 (thus causing the major frame 200 to repeat again).

Figure 12:
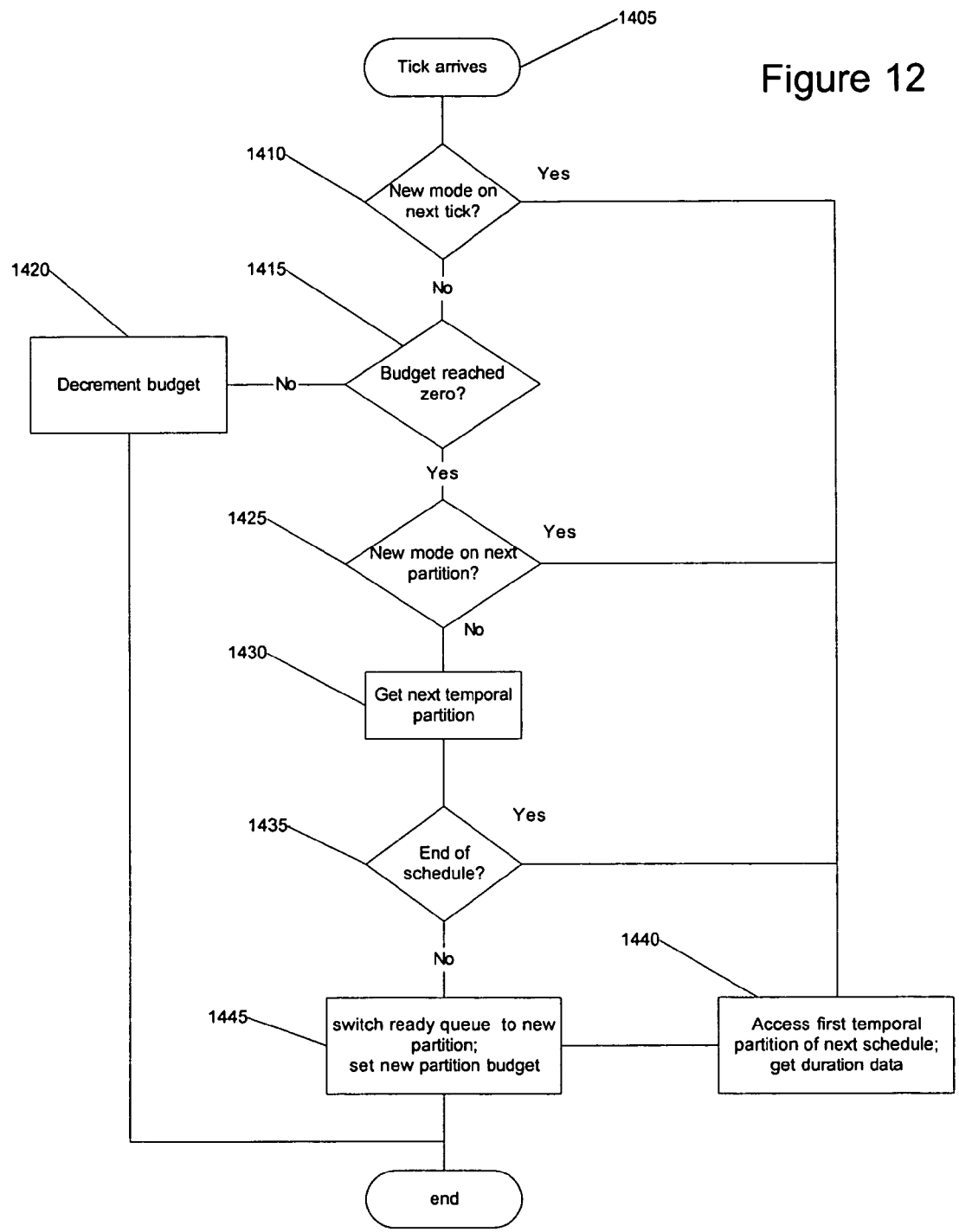
FIG. 12 is a flow chart illustrating the operation of the system described in FIG. 11.

FIG. 12 is a flow chart illustrating the operation of the system described in FIG. 11. When a tick arrives (step 1405), the "transition" data structure is checked to see if a new schedule mode has been requested on the next tick (step 1410). If not, the budget data structure is checked to see if it has reached zero (step 1415). If not, the partition budget data structure is decremented (step 1420), and the scheduling process exits. If the partition budget data structure is zero, the "transition" data structure is checked to see if a new schedule mode has been requested on the next temporal partition (step 1425). If not, the entry associated with the next temporal partition 201 is accessed from the schedule data structure 1205 (step 1430). If the attempt to access the next temporal partition 201 finds the end of the temporal partitions for the schedule (step 1435), or if either of the checks of the transition data structure found a transition indicator (see steps 1410 and 1425), the duration of the first temporal partition of the next schedule mode is loaded (step 1440).

Upon transition to a new temporal partition, the "budget" data structure is loaded from the duration value in the entry for the temporal partition in the schedule data structure, and the "ready_Q_head" pointer is adjusted to point to the top of the new combined ready queue (the kernel ready queue and the partition ready queue associated with the new spatial partition) (step 1445).

As shown in FIG. 6, not all the time available in a major time frame 200 may be scheduled to partitions. Such unscheduled time may be used by core operating system 112 for system operations or may simply be idle time.

Each partition operating system is preferably implemented as a user-level executable entity on top of the core operating system. In a preferred embodiment of the present invention, the partition operating system operation does not depend on the details of the core operating system. Rather, the partition operating system simply needs a specific set of services to be provided by the core operating system—particularly services related to the underlying system hardware (e.g., I/O operations, interrupts, exceptions). To provide this level of functionality, an abstraction layer 1070 (see, e.g., FIG. 7 discussed below) is preferably interposed between the partition operating systems and the core operating system.

Preferably, abstraction layer 1070 is a thin layer of code that abstracts the specifics of the underlying core operating system, allowing the partition operating systems to run. In order to provide sufficient separation among the core operating system and the various partitions, it is advantageous to limit the number, and nature, of communication between the core operating system and each partition operating system. This architecture allows the core operating system to be used with multiple types of partitions operating systems (perhaps in the same overall system), and allows the partition operating system to run on more than one type of core operating system, with minimal changes. A particularly preferred embodiment of the abstraction layer will now be described, wherein the communication between the partition operating systems and the core operating system is limited to:

1. Core OS System Calls
2. Pseudo-Interrupts to the partition OS

In this embodiment, abstraction layer functionality resides in both the core operating system and each partition operating system. Each half of the abstraction layer understands the requirements and data format expected by the other half.

System calls are initiated by the partition operating system to request the core operating system to perform a desired service. In this example, there is only one system call API defined by the abstraction layer, which can multiplex all service requests. The partition operating system can request a core operating system service by issuing the system call with parameters indicating the requested service. This system call causes the abstraction layer to convert the call into an appropriate core operating system API call(s) which performs the desired service(s). Preferably, the set of system services (methods) that the partition operating system is allowed to request is limited and parameters validation is performed on all arguments passed via the system call.

In accordance with one preferred embodiment of the present invention, time management within a partition is accomplished through maintenance of a single timer queue. This queue is used for the management of watchdog timers, timeouts on various operations.

Elements on the queue are advanced when a system clock "tick" is announced to the partition operating system. Each tick denotes the passage of a single unit of time. Ticks are announced to the partition operating system from the core operating system through the "pseudo-interrupt" mechanism (specifically, through the system clock tick event). During initialization of the partition operating system, the current tick count maintained by the partition operating system will be set to equal the value of the core operating system tick count (as result, the tick count of each partition will be synchronized with each other and the core OS). Preferably, there are no limits on the clock tick rate that can be accommodated by the partition operating system, other than the available processor cycles that can be utilized by the system in servicing clock hardware interrupts and issuing pseudo-interrupts.

Preferably, clock ticks are only delivered to a partition during that partition's window of execution. When the core operating system schedules in a new partition, the clock ticks are then delivered to the newly scheduled partition via the system clock tick event. The issuance of clock ticks to the scheduled-out partition recommences at the start of the partition's next window. At this point, the core operating system announces, in batch mode (e.g., with a single pseudo interrupt), all the clock ticks that have transpired since the last tick announced to the partition in its previous window. In such a system, a timeout (or delay) can expire outside the partition's window, but the timeout is only acted upon at the beginning of the next partition window. It should be appreciated, however, that if a particular time out (or delay) is critical, the system integrator could simply increase the duration of temporal partition 201 for the corresponding spatial partition 150, or provide that a plurality of temporal partitions 201 be assigned to the spatial partition.

The batch delivery of clock ticks allows the core operating system to conserve processor cycles. Although the core operating system is still required to service the clock hardware interrupts, processor cycles are conserved by elimination of the overhead involved in issuing pseudo-interrupts, and the subsequent processing of the ticks within the various partition operating systems. This is particularly true for systems that require a timeout specification granularity of 0.25 milliseconds (which translates into 4000 ticks per second).

Further optimizations may be made to the tick delivery facilities in order to enhance the throughput of the exemplary system. One optimization permits a partition to specify that it does not need tick delivery for a certain number of ticks (e.g., no tasks require the updating of the tick count until "X" number of ticks have occurred). Once the threshold number of ticks have occurred, the core OS may deliver a single pseudo-interrupt representing all subsequent ticks that have occurred in the system. This optimization reduces the number of pseudo-interrupts generated (and handled), thus providing the system with additional productive cycles. Core OS 112 provides an API (which may be accessible to partition OS 160 via the system call facility of the abstraction layer 1070) allowing the partition OS to specify the number of ticks (relative to the current tick count) to wait until generating a System Clock Tick pseudo-interrupt. This value may be stored in a location in task control data structure 118 associated with the particular partition making the request.

Another optimization permits the core OS to reset the system tick counter prior to rollover. As ticks are accumulated on a periodic basis, at some point in time the quantity stored in the system tick counter will overflow, causing a reset. Although a system tick counter reset can be handled at the time of overflow, it may introduce unwanted, non-deterministic delays in overall system operation while the tick counter reset is performed and the associated variables are recalibrated. A facility is provided in core OS 112 which allows the core OS 112 to cause a system tick counter reset at a time which is most convenient for the overall system (i.e., the reset will have the smallest impact on system operation). Core OS 112 can detect such a condition based on scheduling workload information or other metrics. A similar facility may be provided in each partition OS, if desired.

Each partition may employ its own scheduler 162, having an independent scheduling algorithm. For example, tasks within a partition may be scheduled using a priority scheme. In a preferred embodiment of the present invention, the priority scheme is implemented in accordance with a preemptive priority-based algorithm. In such an embodiment, each task has an assigned priority, and in each partition, the partition operating system scheduler uses the priority assigned to each task to allocate the CPU to the highest-priority task within the partition that is ready to execute.

In a pre-emption based scheme, pre-emption occurs when a task of higher priority than the currently executing task becomes ready to run. In general, a higher-priority task may become ready to run as a result of the expiration of a timeout, or the new availability of a resource that the task had been pending on. Pre-emptive events are delivered from the core operating system to the partition operating system, through the pseudo-interrupt mechanism. These events, which may result in a higher priority task becoming available, include but are not limited to, the system clock tick and system call completed signals.

The scheduling of equal priority tasks can be implemented in a number of ways. For example, equal priority tasks can be scheduled on a first-come-first serve basis (e.g., using a queue of equal priority tasks). Alternatively, round-robin scheduling could be used. Preferably, the system allows the system integrator to select either round-robin scheduling or first-come-first-serve scheduling. Round-robin scheduling allows the processor to be shared by all tasks of the same priority. Without round-robin scheduling, when multiple tasks of equal priority must share the processor, a single non-blocking task can usurp the processor until pre-empted by a task of higher priority, thus never giving the other equal-priority tasks a chance to run. In accordance with round-robin scheduling, a "time slice" (or interval) is defined which represents the maximum time that a task is allowed to run before relinquishing control to another task of equal priority. Preferably, the "time slice" is a variable that can be set by calling an appropriate routine.

As described previously, when the partition operating system 160, or an application running in the partition operating system, needs to request a service from the core operating system, a system call is issued from the partition operating system to the core operating system via abstraction layer 1070. If the system call is a blocking system call, then the core operating system assigns a worker task 124 to complete the request, and returns control to the partition operating system. The partition operating system then places the requesting task in the pend queue, and applies the scheduling algorithm to determine the next task that should be run. When the assigned core operating system task completes the system call, a system-call-complete pseudo interrupt is issued by the core operating system to the partition operating system. The pseudo-interrupt handler for the partition OS is executed, which retrieves the event data from the event queue. This event data, in the preferred embodiment, includes a cookie value, which allows the event to be matched to the task that is in the pending queue. The partition operating system can then determine if the pending task should regain the processor, in which case it pends the currently executing task and schedules the requesting task. Alternatively, the system could be designed such that, upon receiving the system call complete, the partition operating system places the task in the "ready" queue (i.e., makes the task ready to run, but does not deschedule the current task).

Figure 7:
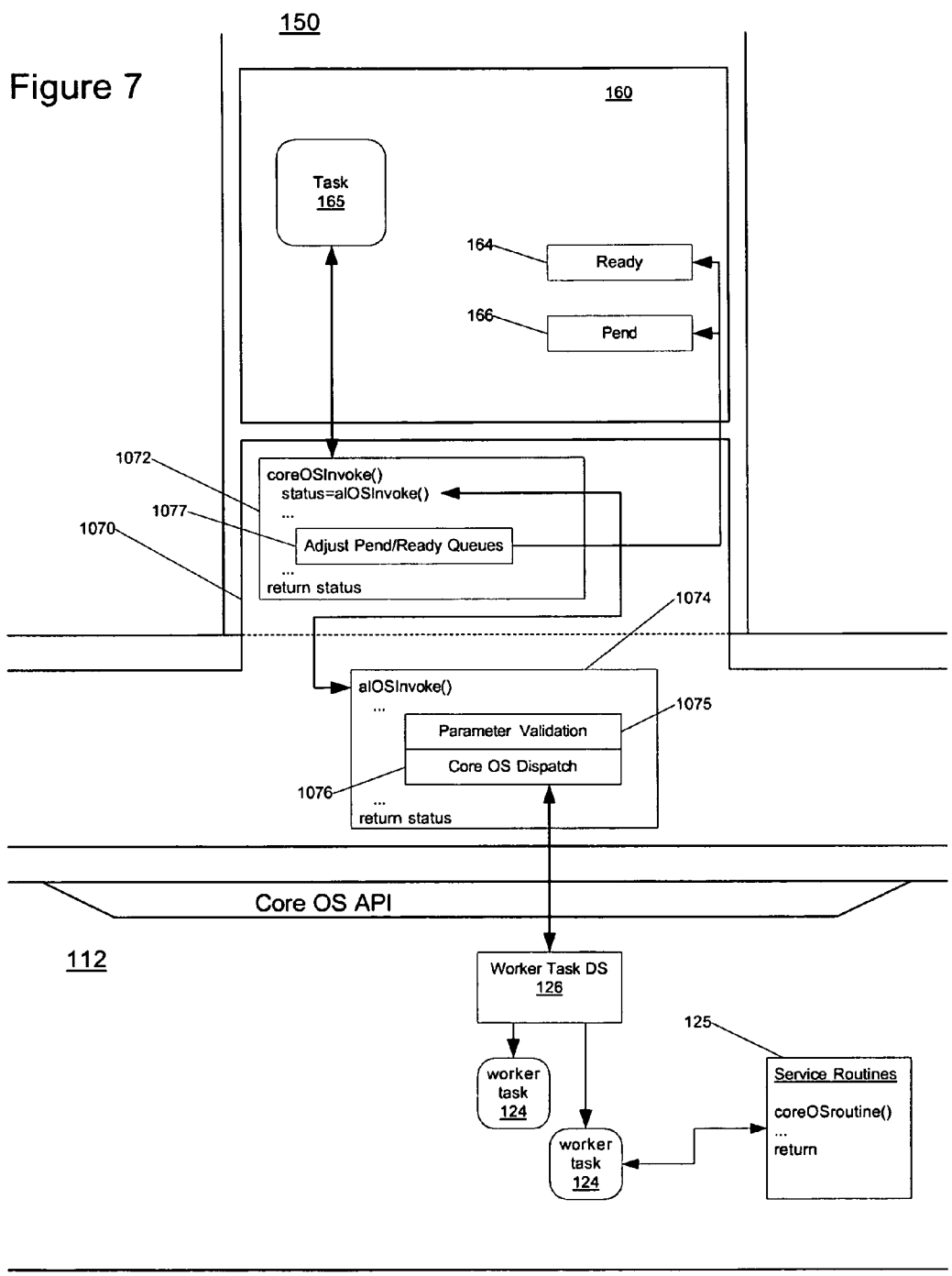
FIG. 7 illustrates an exemplary system call facility implemented via an abstraction layer.

FIG. 7 illustrates an exemplary system call facility implemented via abstraction layer 1070 in conjunction with a partition OS 160 that is the VxWorks® 5.5 operating system and a core OS 112 that is the VxWorks® AE 1.1 operating system. Abstraction layer 1070 is implemented by each partition 150 and the core OS 112. The portion of abstraction layer 1070 implemented in partition 150 provides a routine coreOSInvoke( ) 1072 as the sole API to core OS 150. coreOSInvoke( ) has the definition:

```
OS_INVOKE_STATUS CoreOsInvoke (
    SYSCALL_METHOD    method,
    UINT32            *returnValue,
    UINT32            *methodErrno,
    UINT32            cookie,
    UINT32            argument1,
    ...
    UINT32            argument n
    );
```

Where the specified parameters have the following meanings:

method: An enumeration that specifies the core operating system service to be invoked.
returnValue: A pointer to an unsigned integer, which is de-referenced to store the return value from the system call.
methodErrno: A pointer to an unsigned integer, which is de-referenced to store the error number value (if any) set by the system call.
Cookie: A value that is unique to the requesting partition. Typically it is the ID of the partition operating system task that issued the request. This value has no significance to the core operating system. When the system call completes, the cookie is returned back to the requesting partition (e.g., via pseudo-interrupt), and assists the partition operating system in identifying the task whose request has been completed.
argument1 ... argument n: The argument(s) that is passed to the core operating system function being invoked. There may be zero or more arguments to a system call, depending on the service requested.
OS_INVOKE_STATUS: enumerated result code of call. Can be one of OK, ERROR, PENDING, OSNOTREADY, or BADPARAMS.

The core OS portion of the abstraction layer 1070 provides a matching routine alOSInvoke( ) 1074 having similar parameters. Routine alOSInvoke( ) 1074 includes a facility 1075 to perform parameter validation on parameters passed to it, and a Core OS API Dispatch facility 1076 to map methodIDs to corresponding core OS 112 API system calls and execute the appropriate core OS API system call (if available).

As described above, the preferred abstraction layer 1070 employs two internal layers via the coreOSInvoke( ) and alOSInvoke( ) routines. Any number of layers could be implemented (for example, only one layer), however the use of two layers within abstraction layer 1070 facilitates the immediate pre-emption of blocked tasks currently executing in partition 150 (as will be further described below), which improves system performance.

Figure 8:
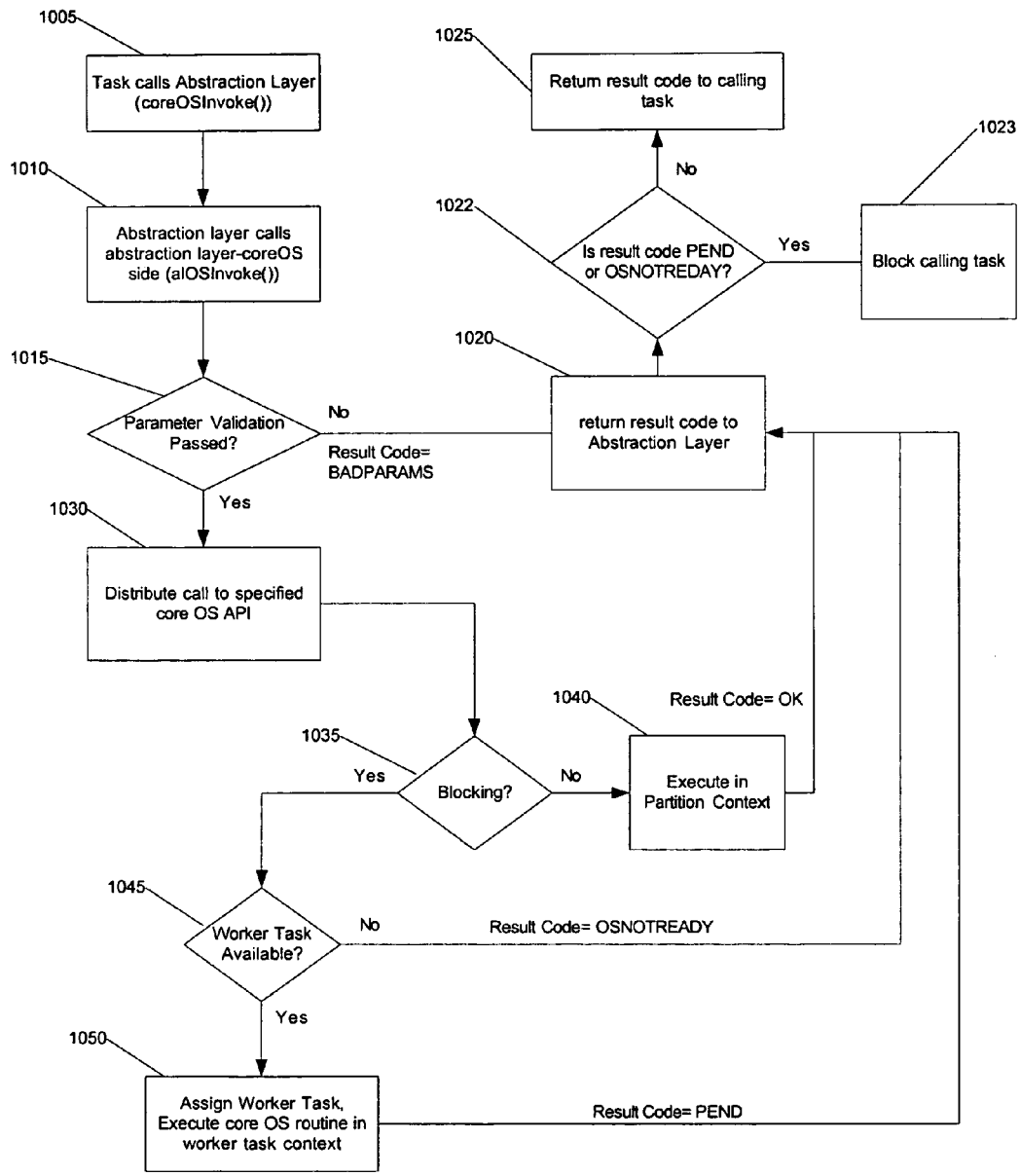
FIG. 8 is a flowchart illustrating the operation of the facility of FIG. 7.

The operation of the example of FIG. 7 is illustrated in flow chart form in FIG. 8. Assume task 165 executing in partition OS 160 has made a system call by calling coreOSInvoke( ) (step 1005). coreOSInvoke( ) makes a call to alOSInvoke( ) (step 1010). alOSInvoke( ) performs a parameter validation on the parameters provided by task 165 (step 1015)—for example, by checking to insure that the methodID specified is valid, that the returnValue and methodErrno pointers point to addresses within the partition's assigned memory space, and whether the arguments provided are valid for the method specified by the methodID (this may be done by mapping the methodID to a method-specific parameter validation routine). If the parameter validation fails, a BADPARAMS return result code is passed back to coreOSInvoke( ) (step 1020), which is then returned to task 165 for handling (step 1025).

If parameter validation is achieved, the Core OS API dispatcher is invoked (step 1030) to map the methodID to the appropriate core OS system call. As part of the Core OS API distributor, it is first determined whether the method being invoked is a blocking or non-blocking method (step 1035). If the method is non-blocking, it is executed in the partition's task context (step 1040), an OK return result code is returned to coreOSInvoke( ) (step 1020), which is then returned to task 165 (step 1025). If the method is blocking, it is then determined whether a worker task associated with the active partition is available (step 1045). This may be accomplished by examining the worker task data structure for the active partition and determining whether any worker tasks are not in use. If a worker task is available, the available worker task is assigned, made unavailable in the worker task data structure, and scheduled in the core OS (step 1050) and the return code PENDING is returned to coreOSInvoke( ) (step 1020). If a worker task is not available, return code OSNOTREADY is returned to coreOSInvoke( ) (step 1020).

As part of the coreOSInvoke( ) routine, a Partition Queue Adjustment function 1077 is provided to check the return code for a code that will cause the currently executing task 165 to block (step 1022). For example, a return code of PENDING indicates that a worker task is blocked at the core OS, and therefore task 165 should also block pending the completion of the worker task. Thus, for a return code of PENDING or OSNOTREADY, the partition queue adjustment facility 1077 places task 165 on the pending queue of partition OS 160 and causes the scheduling of the next ready task in the partition (step 1055). Task 165 will become ready upon receipt by partition OS 160 of a pseudo-interrupt indicating that the assigned worker task has completed (for the PENDING return code) or that any worker tasks have completed (for the OSNOTREADY return code).

Figure 13:
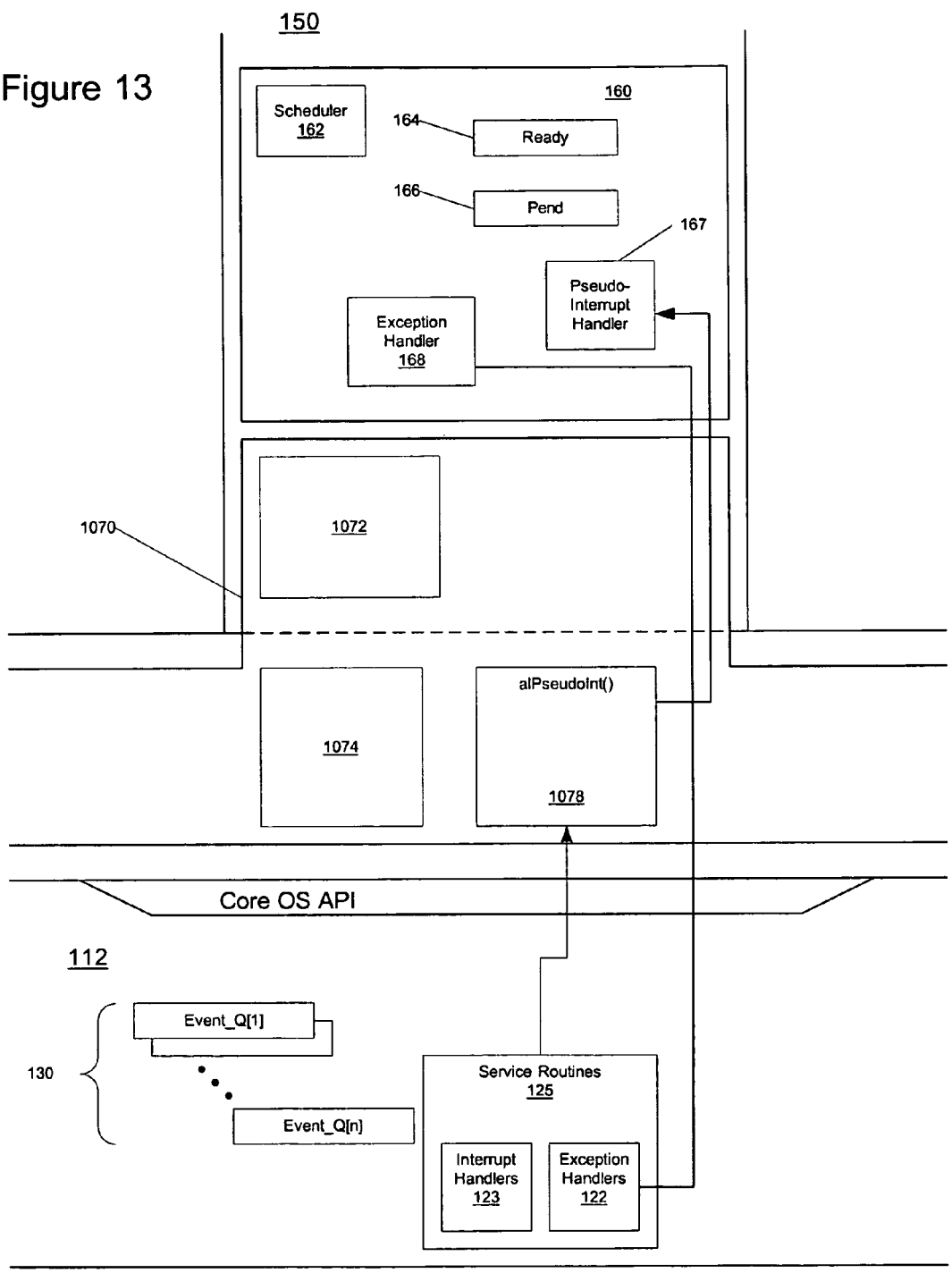
FIG. 13 illustrates a pseudo-interrupt system.

Pseudo-interrupts are a way to provide asynchronous event notifications/information from the core operating system to the appropriate partition operating system (as contrasted with a traditional hardware interrupt/exception). A pseudo-interrupt system is illustrated in FIG. 13. In accordance with a preferred implementation, each partition 150 is provided with a corresponding event queue 130, located, for example, within core operating system 112. Each event queue 130 may be constructed as an array, with a number of locations to store event data elements (representing the occurrence of events). The format of an exemplary event data element may take the following form:

```
typedef struct
{
    VT_EVENT_TYPE    evtType;    /* event type */
    UINT32           data1;      /* event data word 1 */
    UINT32           data2;      /* event data word 2 */
    UINT32           data3;      /* event data word 3 */
    UINT32           data4;      /* event data word 4 */
} VT_EVENT;
```

As indicated, the exemplary event element includes a field indicating the event type (described below), and up to four 32-bit words of data. The amount and type of data passed depends on the event in question (for example, a "System Call Complete" event may put the cookie value passed by the calling partition as the event data, so that the partition can match the event to the task that made the system call). An exemplary set of events is as follows:

1. Power Interruption: reports power interruption
2. Synchronize: used by the core OS to detect whether the specified parton OS is executing a critical code section, such that access of OS data structures may produce inaccurate results. Useful for interactions with development tools.
3. System Clock Tick: reports the occurrence of a "tick" of the system clock, allowing each partition OS to receive synchronized time information.
4. Port Receive Notification: reports the receipt of a message in a destination buffer 303 (see FIG. 17, and accompanying discussion)

5. Port Send Notification: reports that of a message in a source buffer 302 has been sent (see FIG. 17, and accompanying discussion)

6. System Call Complete: reports the completion of a previously requested system call to the core OS that was dispatched to a worker task It should be noted, however, that synchronous exceptions are not queued in this implementation. Rather, the core operating system re-vectors the program flow of the partition's code by directly changing the program counter (pc) to execute the partition's synchronous exception handler.

In the preferred embodiment, the size of each event queue 130 is pre-defined as the sum of all the possible events which may occupy the event queue for a particular partition. For example, since the number of worker tasks 124 is fixed for a particular partition OS, the number of slots in the event queue 130 reserved for System Call Complete events for that partition OS need only be the number of worker tasks 124 associated with that partition. One slot may be reserved for each of the Partition Restart, Synchronous Exception, System Clock Tick and Synchronize events. The utilization of such a fixed size event queue ensures that an event queue overflow will never occur.

Abstraction layer 1070 includes a pseudo-interrupt facility 1078. Pseudo-interrupt facility 1078 performs two operations: posting an event to the event queue 130 of the specified partition OS 160, and raising a signal to that partition. Communication of the pseudo-interrupt is through the well-known signaling functionality (for example, as specified by the POSIX standard). An exemplary API for psuedo-interrupt facility 1078 can be:

```
STATUS alPseudoInt
(
    PARTITION_ID    partId,     /* Receiving partition ID */
    VT_EVENT_TYPE   evtType,    /* Event being posted */
    UINT32          data1,      /* Event data word 1 */
    UINT32          data2,      /* Event data word 2 */
    UINT32          data3,      /* Event data word 3 */
    UINT32          data4       /* Event data word 4 */
);
``` where the elements evtType, data1, data2, data3 and data4 correspond to the fields of the event element data structure, and partID specifies a partition 150 existing in system 100. Pseudo-interrupt facility 1078 may be accessed, for example, by the service routines 125 of core OS 112, thus allowing hardware interrupts (such as a system timer interrupt) to be propagated to the appropriate partition OS.

Each partition OS 160 implements one or more pseudo-interrupt handlers 167, which are executed upon receipt of the signal generated by pseudo-interrupt facility 1078. One pseudo-interrupt handler 167 may be used, in which case a single signal may be used for all pseudo-interrupts. Alternatively, multiple pseudo-interrupt handlers 167 can be specified, for example, to handle different pseudo-interrupt events, in which case multiple signals may be used. In any case, pseudo-interrupt handler 167 will issue a system call to core OS 112 in order to dequeue the event that has been posted to the partition's event queue 130 (and retrieve any associated event data). The pseudo-interrupt handler 167 will then execute appropriate facilities to service the event.

Figure 15:
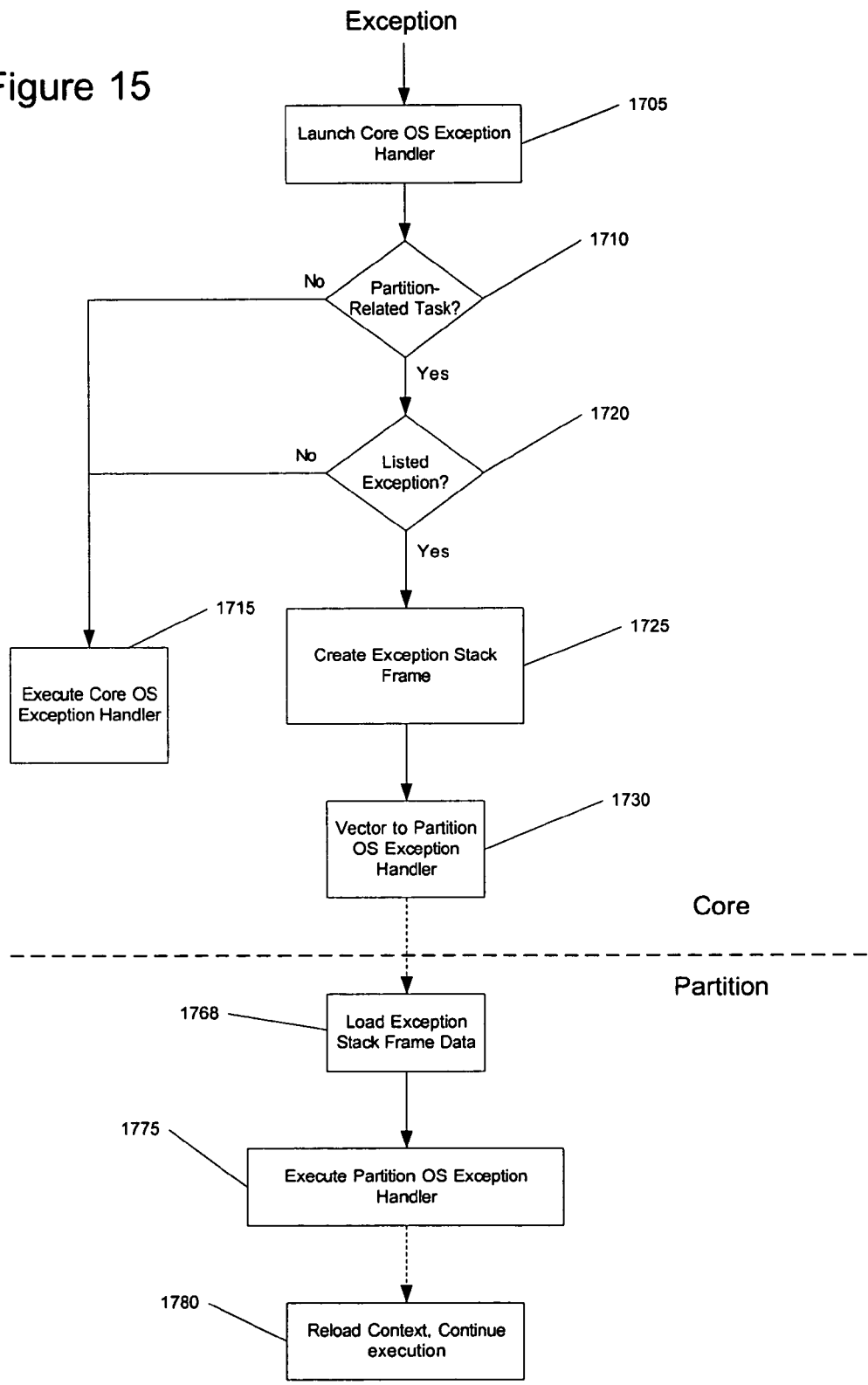
FIG. 15 is a flow chart illustrating the handling of an exception.

FIG. 15 is a flow chart illustrating the handling of an exception in the exemplary system 100. Referring to FIG. 15, upon the occurrence of an exception (e.g., divide by zero), an exception handler 122 in place in the core OS 112 is activated (step 1705). This exception handler will be executing in the context of the task that caused the exception. It is first checked whether the task that caused the exception is a non-partition core OS task (step 1710). If it is such a task, the appropriate exception handler in the core OS is executed (step 1715). Once it is determined that a partition related task caused the exception, the exception identifier is compared to a list of exception identifiers serviceable by the partition (step 1720). If the exception identifier is not listed, the appropriate core OS exception handler is executed (step 1715).

If the exception identifier is listed, the exception handler then creates an "exception stack frame" on the stack of the executing task (step 1725). The exception stack frame may include various information about the state of the system at the time of the exception, including the contents of registers associated with the executing context. Execution is then transferred to an exception handler 168 of the appropriate partition OS (for example, by loading the program counter with the address of the exception handler 168) (step 1730).

The exception stack frame data is then loaded (step 1768) and the appropriate partition OS exception handler is then executed (step 1775). The appropriate partition OS exception handler may be selected based on data stored in the exception stack frame, for example, through the use of a vector lookup table in the partition OS. The partition OS exception handler may perform any number of remedial operations, including suspending/terminating the offending task. If the partition OS exception handler returns (e.g., the previously executing task was not the offending task), the previous context data is reloaded from the task stack (step 1780), and the previously executing task is permitted to continue execution.

Development of the system according to the present invention may require the use of development tools, such as provided as part of an integrated development environment (IDE). Such development tools are commonly used for development of software for systems implemented as so-called embedded computer systems, which may have reduced user interfacing capabilities (such as displays and data entry devices). The tools may be located on a separate computing system (a so-called "host" computing environment) with a link to the "target" embedded computing system (via a communication link such as an ethernet connection or serial link).

Figure 14:
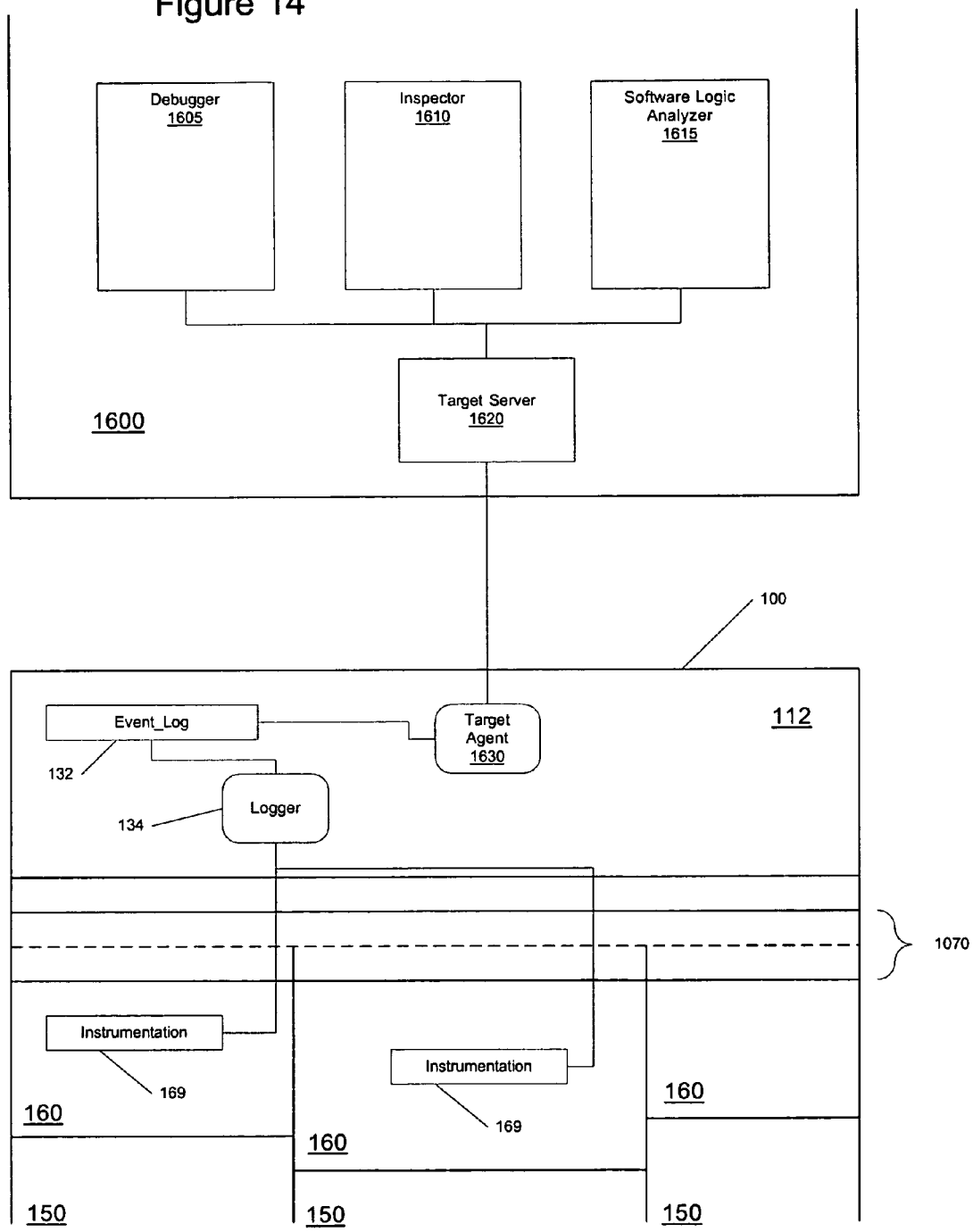
FIG. 14 illustrates an IDE (and its associated tools) connected to a target system implementing a core OS and three partitions.

FIG. 14 illustrates an IDE 1600 (and its associated tools) connected to a target system implementing a core OS 112 and three partitions 150. Tools depicted in IDE 1600 include a debugger 1605, inspector 1610 and software logic analyzer 1615. Each of these tools are connected to a target server 1620, allowing communication between the tools and the target system 100.

Core OS 112 includes a target agent 1630. Target agent 1630 provides services to communicate with target server 1620 (for example, the WDB Protocol), such that requests/commands from IDE 1600 can be processed at target system 100. Target agent 1630 operates as a task under core OS 112 (thus allowing it to be serviced as a scheduled task).

A single target agent 1630 permits access by IDE 1600 to core OS 112 and each partition 150. Correspondingly, only a single instance of each tool of IDE 1600 may be needed to perform operations on core OS 112 and each partition 150. Since target agent 1630 operates in core OS 112 as a core OS task, target agent 1630 has a full system view and may access data structures throughout system 100, including kernel data structures for each partition OS 160.

Figure 16:
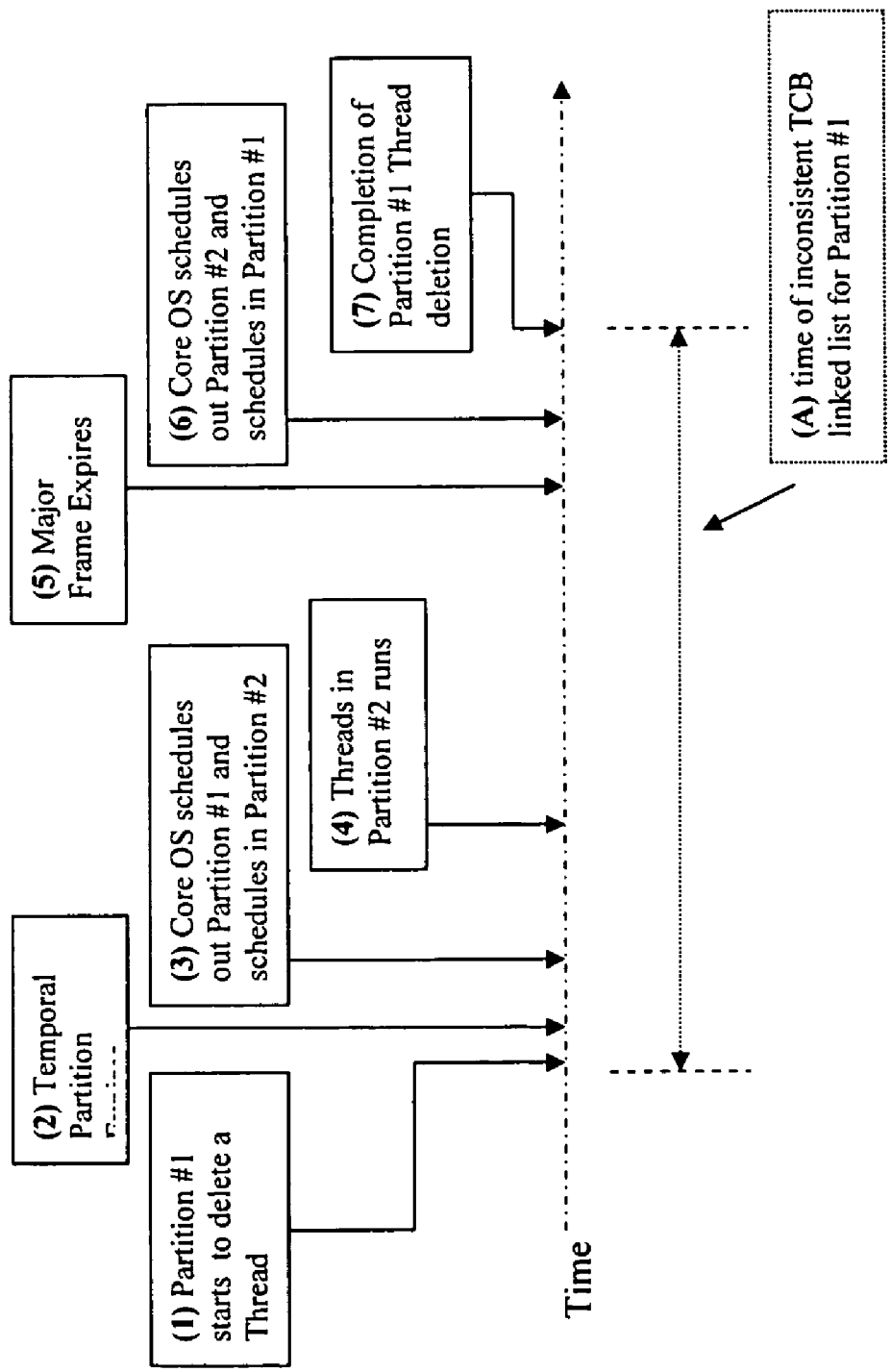
FIG. 16 illustrates a hypothetical timeline in connection with the operation of the system.

A problem raised by the use of multiple independent partitions in the use of target agent 1630 is insuring the data obtained from each partition is accurate. Due to the time and space partitioning, instances could arise where partition data could be left in an inaccurate/inconsistent state at a point when a request is made to the target agent to retrieve such data. An example of such a situation is provided in FIG. 16.

In this example, partition #1 has started to delete a thread executing in partition #1, but its temporal partition has expired prior to completion of the deletion process. The core OS schedules partition #2 upon expiration of the temporal partition, causing various ready threads existing in partition #2 to execute. Once the temporal partition associated with partition #2 expires (as well as any other intervening temporal partitions), core OS will schedule partition #1 again, and the thread deletion process may complete. The time from when the first temporal partition for partition #1 ends until the second temporal partition #2 begins may have an inaccurate task control block for partition #1.

In order to prevent data inaccuracy, target agent 1630 will cause the Synchronize pseudo-interrupt to be generated and sent to the partition from which system information is requested. The synchronize pseudo-interrupt will cause the partition pseudo-interrupt handler to execute, determine the identity of the pseudo-interrupt, and launch the appropriate service routine—which in this case is a routine that performs a special system call to the core OS indicating that the partition OS is not executing a critical code section. If the partition OS is executing a critical code section (or if the partition is not active), the handling of pseudo-interrupts will be disabled, and thus no system call will be made (until pseudo-interrupt handling is enabled, causing the pseudo-interrupt handler to execute). Upon receipt of the system call, target agent 1630 will be able to operate on the partition as needed.

Alternatively, communication between the target agent 1630 and a partition OS 160 may be accomplished using semaphores. For example, each partition upon instantiation can be associated with two binary semaphores (e.g., "Sem1" and "Sem2"). Upon target agent 1630 generating the Synchronize pseudo-interrupt, target agent 1630 takes Sem1 for the partition for which data access is required, causing the target agent 1630 to block. Upon handling the pseudo-interrupt, the pseudo-interrupt handler gives Sem1 (allowing the target agent 1630 to unblock) and takes Sem2, causing the partition to block. Target agent 1630 can now operate on partition 150 as needed. Target agent gives Sem2 when its operations are completed, thereby unblocking the partition 150 and allowing the previously executing task to continue. The identifiers for Sem1 and Sem2 may be stored in a location in the task data structure 118 associated with their corresponding partition 150.

In order to implement the functionality of software logic analysis, each partition OS 160 includes instrumentation 169 which performs system calls to core OS 112 (for example, using the abstraction layer 1070) to log instrumented events. Core OS 112 includes a system event log 132, and a logging facility 134. Event buffer 132 may be implemented in a manner similar to that of other well known logic analysis systems, such as the WindView® software logic analyzer tool of Wind River Systems, Alameda, Calif. Event buffer 132 may include multiple buffers (allowing simultaneous upload and download), and the ability to store event data having timestamps (including sequential stamps), event codes and associated data. Logging facility 134 may implement an API that allows the passing of event information from a partition 150 to the event log 132, for example, as follows:

```
STATUS wvEventLogWrite
(
    short      eventId,
    BOOL       timestamp,
    void * src,
    int        eventSize
);
``` where eventID is an event identifier, timestamp indicates whether the event should be timestamped, src is a pointer to the start of the event data, and eventSize is the length of the event data. Instrumentation 169 may be placed in desirable places in partition OS 160 (or user application 170) to report the occurrence of system events (e.g., semaphore give/take, context switching). Collection of event data via instrumentation 169 may be enabled or disabled in each partition 150 independently (for example, via instrumentation switches or triggering). Timestamp information for event data, generated by each partition or by the core OS, may be generated based on timer functionality maintained by the core OS (e.g., the system tick count) and added during the storing of event data in event log 132.

A complication of the simultaneous collection of event data from multiple partitions (and the core OS), is the proper interpretation of that data at the host tool, particularly where each partition may generate event data having disparate meanings. The embodiment according to the present invention includes a method to configure the host tool to properly interpret event data uploaded from event log 132, using event definition libraries.

The first events read from the event log upon initialization will be configuration data for the Core OS part of the log. In this configuration data will be an indicator that multiple partition data (also referred to as "namespaces") will be stored in the log. The core OS will provide a namespace identifier for itself, as well as a list of event definition libraries applicable to event data generated by the core OS. These event definition libraries may be included in the configuration data (and thus uploaded to the software logic analyzer 1615 for reference during event log parsing), or may be already located on the host system (and then simply accessed directly by the software logic analyzer 1615). Following the core OS configuration data will be configuration data for each partition configured to generate event data. This partition configuration data will include a namespace identifier used to identify event data sourced from the particular partition, as well as a list of the event definition libraries to be used for the partition (and potentially event definition library lists/data). Thereafter during event data collection, logging facility 134 may place "namespace selection" events into the event log 132 prior to logging event data from a particular partition (e.g., a partition different from the most recently logged partition), the namespace selection event including the namespace identifier of the particular partition. Using the namespace selection events, source of the event data can be determined by the software logic analyzer, and the appropriate event definition library can be used to interpret the event data.

Pursuant to another feature of the present invention, a communication system is provided to permit the passing of messages between partitions 150. A message is sent from a single partition 150 to one or more other partitions 150. In the exemplary embodiment of the present invention, the communication system comprises ports, messages and a channel. Each partition that implements bidirectional inter-partition communication includes a source port and a receiving port. A partition that does not require interpartition communication may include zero ports, and a partition that requires only one-way communication could potentially include only one port. The channel is a logical set of source and receiving ports for the transmission of messages.

Figure 17:
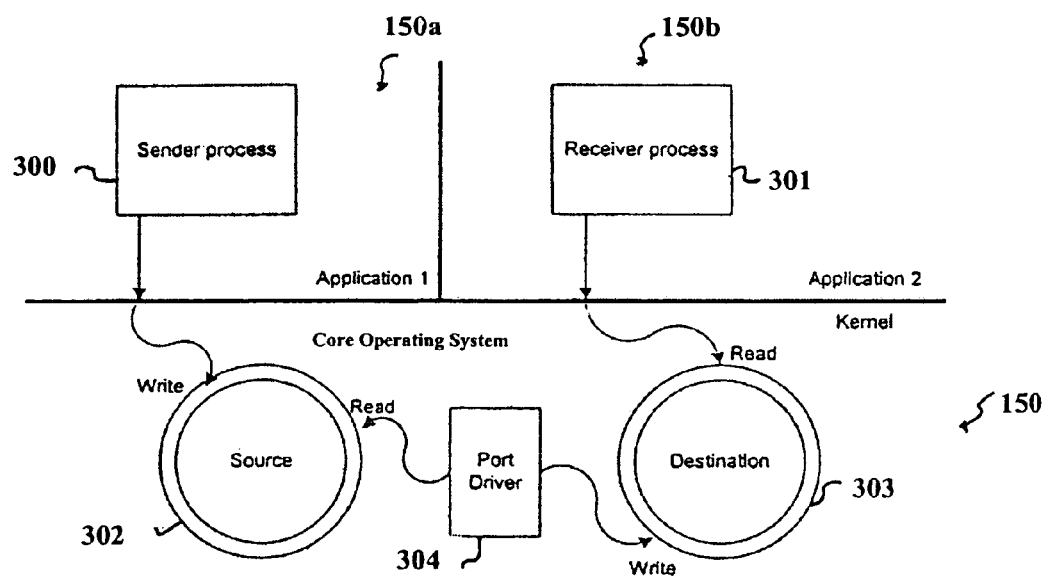
FIG. 17 is a block diagram of a communication system for inter-partition message passing according to an exemplary embodiment of the present invention.

Referring now to FIG. 17, there is illustrated an exemplary communication system for passing a message between two of the partitions 150. In this example, the sending partition 150a includes a sender process 300, and the receiving partition 150b includes a receiver process 301. Moreover, each of a source port 302 for the sending partition 150a and a receiving port 303 for the receiving partition 150b comprises a circular buffer implemented in the core operating system 112. Each circular buffer is defined by a set of attributes including, for example, an identification of the partition with which it is associated, and whether it is a source port or a receiving port.

A port driver 304 is implemented in the core operating system 112, and is operable to read messages stored in each source port 302 and to write the read messages into the receiving port(s) 303 of the partition(s) identified in the message as the receiving partition(s) 150b. When the sending partition 150a needs to send a message to the receiving partition 150b, the sender process 300 formats a message, including, for example, a message descriptor to identify such information as source and destination of the message. The sender process 300 then writes the message into the corresponding source port 302 circular buffer in the core operating system 112. The sender process 300 then updates a write pointer. The port driver 304 reads each message in the source circular buffer and writes each read message into the receiving port 303 circular buffer of the receiving partition 150b identified in the message descriptor of the message. According to the exemplary embodiment, of the present invention, each receiving partition 150b periodically reads the messages stored in the corresponding circular buffer comprising the receiving port 303 of the partition 150b. A table of message descriptors can be maintained by the core operating system 112 to enable the core operating system 112 to track all messages.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A computer system, which comprises:
a CPU;
a local physical memory system directly coupled to the CPU; and
a core operating system stored in the local physical memory system and executable in the CPU via the direct coupling;
the local physical memory system being defined by and entirely contained within a a system space having a number of memory locations;
the core operating system arranged to create a number of protection domains to partition the system space to partition the local physical memory system contained therein; and
a partition operating system and a partition user application in each partition;
each partition operating system providing resource allocation services to the respective partition user application within the partition.

2. The computer system of claim 1 wherein each protection domain includes a protection view to set resource availability among and between protection domains.

3. The computer system of claim 2 wherein the protection view is set to limit resource availability for at least one protection domain to the at least one protection domain.

4. The computer system of claim 1 wherein the partition operating system of each partition is a real time operating system.

5. The computer system of claim 1 further including a communication system for passing messages between the partitions.

6. A computer system, which comprises
a CPU;
a local physical memory system directly coupled to the CPU; and
a core operating system stored in the local physical memory system and executable in the CPU via the direct coupling;
the local physical memory system being defined by and entirely contained within a a system space having a number of memory locations;
the core operating system arranged to create a number of protection domains to partition the system space to partition the local physical memory system contained therein; and
a partition operating system and a partition user application pair in each partition, whereby the partition operating system, partition user application pairs of the partitions are spatially partitioned from each other;
each partition operating system of each pair providing resource allocation services to the respective partition user application within the partition;
the core operating system time multiplexing the partitions such that the partition operating system, partition user application pairs are temporally partitioned from each other.

7. A method for operating a computer system, comprising the steps of:
providing a CPU;
directly coupling a local physical memory system to the CPU;
implementing a core operating system in the local memory for execution on the CPU;
arranging the local physical memory system to be defined by and entirely contained within a system space having a number of memory locations;
operating the core operating system to create a number of protection domains to partition the system space and the local physical memory contained therein; and
implementing a partition operating system and a partition user application pair in each partition, whereby the partition operating system, partition user application pairs of the partitions are spatially partitioned from each other;
operating each partition operating system of each pair to provide resource allocation services to the respective partition user application within the partition.

8. A method for operating a computer system, comprising the steps of:
providing a CPU;
directly coupling a local physical memory system to the CPU;
implementing a core operating system in the local memory for execution on the CPU;
arranging the local physical memory system to be defined by and entirely contained within a system space having a number of memory locations;
operating the core operating system to create a number of protection domains to partition the system space and the local physical memory contained therein; and
implementing a partition operating system and a partition user application pair in each partition, whereby the partition operating system, partition user application pairs of the partitions are spatially partitioned from each other;
operating each partition operating system of each pair to provide resource allocation services to the respective partition user application within the partition; and
operating the core operating system to time multiplex the partitions such that the partition operating system, partition user application pairs are temporally partitioned from each other.

9. A computer system, which comprises
a CPU;
a local physical memory system directly coupled to the CPU; and
a core operating system stored in the local physical memory system and executable in the CPU via the direct coupling;
the local physical memory system being defined by and entirely contained within a a system space having a number of memory locations;
the core operating system arranged to create a number of protection domains to partition the system space to partition the local physical memory system contained therein; and
a partition operating system and a partition user application pair in each partition, whereby the partition operating system, partition user application pairs of the partitions are spatially partitioned from each other;
each partition operating system of each pair providing resource allocation services to the respective partition user application within the partition;
the core operating system scheduling the partitions such that the partition operating system, partition user application pairs are temporally partitioned from each other.

10. A method for operating a computer system, comprising the steps of:
providing a CPU;
directly coupling a local physical memory system to the CPU;
implementing a core operating system in the local memory for execution on the CPU;
arranging the local physical memory system to be defined by and entirely contained within a system space having a number of memory locations;
operating the core operating system to create a number of protection domains to partition the system space and the local physical memory contained therein; and
implementing a partition operating system and a partition user application pair in each partition, whereby the partition operating system, partition user application pairs of the partitions are spatially partitioned from each other;
operating each partition operating system of each pair to provide resource allocation services to the respective partition user application within the partition; and
operating the core operating system to schedule the partitions such that the partition operating system, partition user application pairs are temporally partitioned from each other.

11. A computer system, which comprises:
a CPU;
a local physical memory system directly coupled to the CPU; and
a core operating system stored in the local physical memory system and executable in the CPU via the direct coupling;
the local physical memory system being defined by and entirely contained within a a system space having a number of memory locations;
the core operating system arranged to partition the system space into a plurality of partitions to partition the local physical memory system contained therein; and
a partition operating system and a partition user application in each partition; each partition operating system providing resource allocation services to the respective partition user application within the partition.

12. A method for operating a computer system, comprising the steps of:
providing a CPU;
directly coupling a local physical memory system to the CPU;
implementing a core operating system in the local memory for execution on the CPU;
arranging the local physical memory system to be defined by and entirely contained within a system space having a number of memory locations;
operating the core operating system to partition the system space into a plurality of partitions and the local physical memory contained therein; and
implementing a partition operating system and a partition user application pair in each partition;
operating each partition operating system of each pair to provide resource allocation services to the respective partition user application within the partition.

13. The method of claim 12, wherein each partition is implemented as a protection domain.

* * * * *